United States Patent
Tsai et al.

(10) Patent No.: US 9,296,174 B2
(45) Date of Patent: Mar. 29, 2016

(54) COMPOSITE LAMINATED STRUCTURES AND METHODS FOR MANUFACTURING AND USING THE SAME

(75) Inventors: Steven W. Tsai, Palo Alto, CA (US); Michel Cognet, Lyons (FR); Philippe Sanial, Vernoux en vivarais (FR)

(73) Assignees: Compagnie Chomarat, Paris (FR); The Board of Trustees of the Leland Stanford Junior University, Palo Alto, CA (US)

( * ) Notice: Subject to any disclaimer, the term of this patent is extended or adjusted under 35 U.S.C. 154(b) by 728 days.

(21) Appl. No.: 13/272,139

(22) Filed: Oct. 12, 2011

(65) Prior Publication Data

US 2012/0177872 A1    Jul. 12, 2012

Related U.S. Application Data

(60) Provisional application No. 61/432,011, filed on Jan. 12, 2011.

(51) Int. Cl.
*B32B 5/12* (2006.01)
*B29C 70/20* (2006.01)
(Continued)

(52) U.S. Cl.
CPC .............. *B32B 5/12* (2013.01); *B29C 70/202* (2013.01); *B29C 70/30* (2013.01); *B32B 5/26* (2013.01);
(Continued)

(58) Field of Classification Search
CPC .................................. B32B 27/00; B32B 5/12
USPC .................................................. 428/105–113
See application file for complete search history.

(56) References Cited

U.S. PATENT DOCUMENTS

| 2,137,235 A | 11/1938 | Carothers |
| 3,411,942 A | 11/1968 | Fritz et al. |

(Continued)

FOREIGN PATENT DOCUMENTS

| CA | 2622685 | 8/2009 |
| CA | 2723385 A1 | 2/2010 |

(Continued)

OTHER PUBLICATIONS

Invitation to Provide Informal Clarification dated Dec. 22, 2011, for Application No. PCT/US2011/056035.
(Continued)

*Primary Examiner* — Aaron Austin
*Assistant Examiner* — Laura Figg
(74) *Attorney, Agent, or Firm* — Alston & Bird LLP

(57) ABSTRACT

Variously configured sub-laminate modules are provided, which comprise at least a first ply and a second ply, the first ply comprising fibers extending in a first orientation, the second ply comprising fibers extending in a second orientation. The second orientation is offset relative to the first orientation, which offset defines an acute angle between the two orientations. The acute angle is less than 90 degrees and in at least one embodiment, the acute angle is approximately 25°. In certain embodiments, the acute angle further defines an unbalanced structure of the sub-laminate module. In certain embodiments, the first and second plies may be further secured relative to one another in a non-crimped configuration. Composite laminated structures formed from various embodiments of the sub-laminate modules are also provided, at least some of which may be homogenized. Various methods of manufacturing the sub-laminate modules and the composite laminated structures are also provided.

38 Claims, 9 Drawing Sheets

(51) Int. Cl.
    *B29C 70/30*     (2006.01)
    *B32B 5/26*      (2006.01)
    *B32B 5/28*      (2006.01)

(52) U.S. Cl.
    CPC ............... *B32B 5/28* (2013.01); *Y10T 156/10* (2015.01); *Y10T 156/1051* (2015.01); *Y10T 428/24124* (2015.01)

(56) References Cited

U.S. PATENT DOCUMENTS

| | | | |
|---|---|---|---|
| 3,490,983 A | 1/1970 | Lee | |
| 3,511,901 A | 5/1970 | Brown | |
| 4,214,932 A | 7/1980 | Van Auken | |
| 4,272,971 A | 6/1981 | Loyd et al. | |
| 4,320,160 A | 3/1982 | Nishimura et al. | |
| 4,469,733 A | 9/1984 | Seddon | |
| 4,507,164 A | 3/1985 | Pott | |
| 4,622,254 A | 11/1986 | Nishimura et al. | |
| 4,639,347 A | 1/1987 | Hancock et al. | |
| 4,680,923 A | 7/1987 | Kaempen | |
| 4,790,052 A | 12/1988 | Olry | |
| 4,883,552 A | 11/1989 | O'Connor et al. | |
| 4,943,334 A | 7/1990 | Medney | |
| 5,055,242 A | 10/1991 | Vane | |
| 5,100,713 A * | 3/1992 | Homma et al. | 428/102 |
| 5,202,165 A | 4/1993 | Lusignea | |
| 5,304,421 A | 4/1994 | Lamy et al. | |
| 5,316,834 A | 5/1994 | Matsuda et al. | |
| 5,333,568 A | 8/1994 | Medner et al. | |
| 5,360,654 A | 11/1994 | Anderson et al. | |
| 5,375,298 A | 12/1994 | Nakamura et al. | |
| 5,445,693 A | 8/1995 | Vane | |
| 5,446,079 A | 8/1995 | Buchanan et al. | |
| 5,478,421 A | 12/1995 | Medney et al. | |
| 5,482,664 A | 1/1996 | Lamy et al. | |
| 5,506,046 A | 4/1996 | Andersen et al. | |
| 5,508,072 A | 4/1996 | Andersen et al. | |
| 5,513,683 A | 5/1996 | Causa et al. | |
| 5,522,904 A * | 6/1996 | Moran et al. | 623/23.34 |
| 5,552,208 A | 9/1996 | Lin et al. | |
| 5,690,474 A * | 11/1997 | Byrnes et al. | 416/134 A |
| 5,700,573 A | 12/1997 | McCullough | |
| 5,763,334 A | 6/1998 | Gupta et al. | |
| 5,807,194 A | 9/1998 | Knutson et al. | |
| 5,852,857 A | 12/1998 | Mark et al. | |
| 5,869,172 A | 2/1999 | Caldwell | |
| 5,958,806 A | 9/1999 | Jensen et al. | |
| 6,277,771 B1 | 8/2001 | Nishimura et al. | |
| 6,295,940 B1 * | 10/2001 | Shonteff | 112/63 |
| 6,365,257 B1 | 4/2002 | Hecht | |
| 6,409,606 B1 | 6/2002 | Nakajima et al. | |
| 6,585,842 B1 | 7/2003 | Bompard et al. | |
| 6,641,893 B1 * | 11/2003 | Suresh et al. | 428/105 |
| 6,851,463 B1 * | 2/2005 | Socci et al. | 152/527 |
| 2001/0001189 A1 | 5/2001 | Johnson | |
| 2001/0053645 A1 | 12/2001 | Henderson | |
| 2002/0123288 A1 | 9/2002 | Davies et al. | |
| 2002/0160146 A1 | 10/2002 | Homma et al. | |
| 2003/0119705 A1 | 6/2003 | Barnabas et al. | |
| 2003/0143909 A1 | 7/2003 | Barnabas et al. | |
| 2003/0152769 A1 | 8/2003 | Kitagawa et al. | |
| 2003/0186038 A1 | 10/2003 | Ashton et al. | |
| 2003/0203179 A1 | 10/2003 | Hawkins et al. | |
| 2004/0069394 A1 | 4/2004 | Armellin et al. | |
| 2004/0098110 A1 | 5/2004 | Williams et al. | |
| 2004/0102123 A1 | 5/2004 | Bowen et al. | |
| 2004/0131834 A1 | 7/2004 | Hiel et al. | |
| 2004/0211354 A1 | 10/2004 | Guirman et al. | |
| 2004/0219851 A1 | 11/2004 | Sahlin et al. | |
| 2004/0219855 A1 | 11/2004 | Tsotsis | |
| 2005/0067042 A1 | 3/2005 | Hirota et al. | |
| 2005/0153820 A1 | 7/2005 | Ohto et al. | |
| 2005/0167030 A1 | 8/2005 | Davies et al. | |
| 2005/0208263 A1 | 9/2005 | Wilkens et al. | |
| 2005/0255766 A1 | 11/2005 | Kruger et al. | |
| 2005/0284562 A1 | 12/2005 | Frantz et al. | |
| 2006/0013990 A1 | 1/2006 | Brentrup et al. | |
| 2006/0032705 A1 | 2/2006 | Isham et al. | |
| 2006/0035548 A1 | 2/2006 | Goto et al. | |
| 2006/0076699 A1 | 4/2006 | Domagalski et al. | |
| 2006/0093802 A1 * | 5/2006 | Tsai et al. | 428/216 |
| 2006/0119011 A1 | 6/2006 | Blackmore | |
| 2006/0121805 A1 | 6/2006 | Krulic | |
| 2006/0157189 A1 | 7/2006 | Gautier et al. | |
| 2006/0252899 A1 | 11/2006 | Himori et al. | |
| 2007/0101657 A1 | 5/2007 | Okajima et al. | |
| 2007/0128435 A1 | 6/2007 | Hiel et al. | |
| 2007/0193491 A1 | 8/2007 | Lilleheden et al. | |
| 2007/0238378 A1 | 10/2007 | Conover et al. | |
| 2007/0269645 A1 | 11/2007 | Raghavendran et al. | |
| 2007/0299416 A1 | 12/2007 | Noda et al. | |
| 2008/0132595 A1 | 6/2008 | Heck | |
| 2008/0139071 A1 | 6/2008 | Bhatnagar et al. | |
| 2008/0170982 A1 | 7/2008 | Zhang et al. | |
| 2008/0177374 A1 | 7/2008 | Zheng et al. | |
| 2008/0213490 A1 | 9/2008 | Strange et al. | |
| 2008/0261474 A1 | 10/2008 | Goering | |
| 2008/0274326 A1 | 11/2008 | Kim et al. | |
| 2008/0286520 A1 | 11/2008 | Colson et al. | |
| 2009/0056857 A1 | 3/2009 | Heinrich et al. | |
| 2009/0098337 A1 | 4/2009 | Xie et al. | |
| 2009/0214815 A1 | 8/2009 | Okada | |
| 2010/0099513 A1 * | 4/2010 | Chao et al. | 473/342 |
| 2010/0119299 A1 | 5/2010 | Montminy et al. | |
| 2010/0147446 A1 | 6/2010 | Ciolczyk et al. | |
| 2010/0285265 A1 | 11/2010 | Shinoda et al. | |
| 2011/0198443 A1 | 8/2011 | Noebel et al. | |

FOREIGN PATENT DOCUMENTS

| | | |
|---|---|---|
| CN | 101181829 | 5/2008 |
| CN | 101319465 | 12/2008 |
| DE | 20 2004 007601 | 11/2004 |
| EP | 0361796 | 4/1990 |
| EP | 687318 | 12/1996 |
| EP | 892716 | 1/1999 |
| EP | 768167 | 9/2000 |
| EP | 1252377 | 10/2002 |
| EP | 761846 | 1/2004 |
| EP | 1155177 | 11/2005 |
| EP | 1758730 | 3/2007 |
| EP | 1188848 | 4/2007 |
| EP | 1805473 | 7/2007 |
| EP | 1957931 | 8/2008 |
| EP | 2033754 | 3/2009 |
| EP | 2121301 | 11/2009 |
| EP | 1540059 | 12/2009 |
| EP | 2138615 | 12/2009 |
| EP | 2140222 | 1/2010 |
| EP | 2151517 | 2/2010 |
| EP | 2222906 | 9/2010 |
| EP | 2326379 | 6/2011 |
| EP | 2262630 | 10/2011 |
| FR | 566207 | 2/1924 |
| FR | 824548 | 2/1938 |
| FR | 1459679 | 4/1966 |
| FR | 2196966 | 3/1974 |
| FR | 2180606 | 9/1974 |
| FR | 2276916 | 1/1976 |
| FR | 2398705 | 2/1979 |
| FR | 2446175 | 8/1980 |
| FR | 2460020 | 1/1981 |
| FR | 2506672 | 12/1982 |
| FR | 2584106 | 1/1987 |
| FR | 2584107 | 1/1987 |
| FR | 2594858 | 8/1987 |
| FR | 2673572 | 9/1992 |
| FR | 2705370 | 11/1994 |
| FR | 2761380 | 10/1998 |
| FR | 2776264 | 9/1999 |
| FR | 2797313 | 2/2001 |
| FR | 2809103 | 11/2001 |
| FR | 2801304 | 2/2002 |

(56) References Cited

FOREIGN PATENT DOCUMENTS

| FR | 2812889 | 2/2002 |
|---|---|---|
| FR | 2852003 | 9/2004 |
| FR | 2868752 | 10/2005 |
| FR | 2889104 | 2/2007 |
| FR | 2928295 | 9/2009 |
| FR | 2949123 | 2/2010 |
| FR | 2937396 | 4/2010 |
| FR | 2939451 | 6/2010 |
| GB | 216319 | 5/1924 |
| GB | 2055011 | 2/1981 |
| JP | 2010196176 | 9/2010 |
| TW | 200936833 | 9/2009 |
| TW | 200938672 | 9/2009 |
| WO | WO03049928 | 6/2003 |
| WO | WO 2004/109216 A2 | 12/2004 |
| WO | WO 2006/121505 | 11/2006 |
| WO | WO 2007/067949 A2 | 6/2007 |
| WO | WO 2009/115737 | 9/2009 |
| WO | WO2010066894 | 6/2010 |

OTHER PUBLICATIONS

Response to Invitation to Provide Informal Clarification dated Jan. 3, 2012, for Application No. PCT/US2011/056035.

TSA1, *Theory of Composites Design*, The first edition was written in 1992, made into an electronic edition in 2003, and updated in 2008. This book is part of an online, 12-week Composites Design Tutorial.
International Search Report and Written Opinion of the International Searching Authority dated Jan. 19, 2012 for Application No. PCT/US2011/056035.
Tsai, Stephen W., "Two-Steps for Competitive Composites," Composites Durability Workshop—15, Oct. 12, 2010, 25 pages, Singapore.
Tsai, Stephen W., "What Makes NCF Bi-Angle Laminate Special," Nov. 10, 2010, 36 pages, Stanford University.
Tsai, Stephen W., et al, "Carbon Non Crimp Fabric," Composites Design Workshop IV, Jan. 19, 2011, 21 pages, Stanford University.
Tsai, Stephen W., The Science and Engineering of Bi-Angle Non Crimp Fabric (Design Tools Identified), Jul. 13, 2011, 54 pages, Stanford University.
Tsai, Stephen W., "Science and Engineering of Bi-Angle Thin-Ply NCF," Sep. 24, 2011, 62 pages, Stanford University.
Sihn, et al., "Experimental Studies of Thin-Ply Laminated Composites," *Composites Science and Technology*, Aug. 24, 2006, pp. 996-1008, No. 67, Elsevier.
State Intellectual Property Office of the P.R.C., Search Report for Application No. 201180065000.4, Apr. 24, 2015, 3 pages, China.

\* cited by examiner

COMPOSITE LAMINATED STRUCTURES AND METHODS FOR MANUFACTURING AND USING THE SAME

CROSS-REFERENCE TO RELATED APPLICATIONS

This application claims priority to and the benefit of U.S. Provisional Application No. 61/432,011, filed Jan. 12, 2011, entitled "Bi-Angle Laminates," which is incorporated by reference herein in its entirety.

BACKGROUND

1. Field of Invention

The present invention relates generally to composite laminated structures, in particular those containing angled ply orientations to achieve desirable improved physical properties, together with methods of manufacturing and using such structures.

2. Description of Related Art

Conventional composite laminated structures are generally designed to emulate the strength characteristics of conventional metal-based laminate materials and as such are constrained to designs having layers of plies that are both symmetrical and balanced. Such conventional structures when so constrained and containing at least three ply layers formed from black carbon fibers, are commonly referred to in the art as "black aluminum" due to their combined carbon makeup and metal-emulating characteristics.

Symmetric laminates involve a reflective or mirror-image equivalence of ply orientation about their mid-plane, while balanced laminates involve an equal number of positively (+) and negatively (−) oriented plies across their entirety. Such constraints have traditionally remained unchallenged due to concerns that conventional composite laminated structures will undesirably warp upon cool down from a curing temperature or increased residual stress when the operating temperature changes.

Symmetric laminates have been traditionally formed by stacking the multiple layers of various unidirectional and woven fabric plies in such a manner that the composite laminate exhibits a mirror-image of itself about a mid-plane of the structure. Such lamination processes are generally time and labor intensive as well as being prone to error, requiring precision ordering of the respective composite layers and may result in an unnecessary number of plies, which may contribute to excessive process waste and cost. Still further symmetric laminates have historically proven cumbersome when seeking to taper the exterior surface of a structure, due at least in part to the desire to maintain symmetry throughout, even when dropping ply layers to form the taper. In addition, as the individual or a pair of symmetric plies with substantially the same orientation is dropped to form a taper, the laminate stacking sequence and thus the material's strength characteristics, are altered.

Balanced laminates, like symmetric ones described above, have been traditionally formed by stacking multiple layers of various unidirectional plies at a plurality of precise orientations with relatively large angles between them. For example, each off-axis ply, such as a +45° ply is typically matched and mirrored by a −45° ply. In addition, a common practice was to have four-ply orientations incorporating angles of −45°, 0°, +45°, and 90°. Alternative, three-ply orientations were also common, such as 0°, ±45° configurations. Critical was that the number of positive (+) and negative (−) oriented plies remain equal.

Balanced and symmetric laminates of this nature have historically created difficulty when trying to minimize laminate thickness, requiring ever thinner plies as the only option. Tapering complexities have existed in these structures as well, given that dropping of particular plies or groups thereof must not disturb the desired symmetry and balance. Further, balanced laminates are orthotropic, where deflection and rotation resulting from bending and twisting moments are uncoupled. This structural response is analogous to that of isotropic materials like metal.

Although not customary in the art, coupled bending and twisting moments may provide desirable deformation characteristics, in particular, permitting designers to reliably predict bending from twisting and cause the two to work against each other, leading to a reduced degree of deflection and/or rotation not possible with orthotropic and isotropic materials. This can be advantageous for long and thin structures, such as for example wind turbine blades, helicopter rotor blades, aircraft wings and tails, and the like, where tip deflection can be reduced in one direction by use of this bend-twist coupling of an unbalanced laminate, but can also provide advantages in many other applications.

Conventional composite laminated structures historically exhibit static and fatigue characteristics that may permit a certain degree of micro-cracking of the structure to form and exist prior to ultimate failure of the structure. Such is due, at least in part, to the stress differential between first ply failure (FPF) and last ply failure (LPF), as commonly known and referred to in the art and as will be described in further detail below. In many applications such micro-cracking is tolerable, making conventional composite laminated structures suitable, at least in this regard. Certain applications, however, cannot tolerate micro-cracking, requiring alternatively designed structures that minimize the stress differential between FPF and LPF. Of course, with at least the previously described symmetry and balance constraints, conventional composite laminated structures with four or more ply angles are generally not suitable for such applications.

Accordingly, a need exists to provide laminate structures and methods of manufacturing and using the same, which minimize the various above-mentioned inefficiencies and limitations of balanced and symmetrical laminate structures, minimize micro-cracking, and expand the first ply failure envelope, all without sacrificing physical properties.

BRIEF SUMMARY

Briefly, various embodiments of the present invention address the above needs and achieve other advantages by providing laminated structures comprising innovatively angled ply orientations to achieve desirable improved physical properties and facilitate manufacturing processes.

In accordance with the purposes of the various embodiments as described herein, a sub-laminate module for use in forming a composite laminate is provided. The sub-laminate module comprises: a first ply comprising fibers extending in a first orientation; a second ply comprising fibers extending in a second orientation, the second orientation being offset relative to the first orientation; and an acute angle defined by the relative offset between the first orientation and the second orientation, the acute angle being less than 90° and defining an unbalanced structure of the sub-laminate module, wherein the first ply and the second ply are secured relative to one another in a non-crimped configuration.

In accordance with the purposes of the various embodiments as described herein, yet another sub-laminate module for use in forming a composite laminate is provided. The sub-laminate module comprises: a first ply comprising fibers extending in a first orientation, the fibers of the first ply comprising a plurality of spread tows lying adjacent to each other; a second ply comprising fibers extending in a second orientation, the fibers of the second ply comprising a plurality of spread tows lying adjacent to each other; and an acute angle defined by the relative offset between the first and the second orientations, the acute angle being less than 90° and defining an unbalanced structure of the sub-laminate layer.

In accordance with the purposes of the various embodiments as described herein, a composite laminated structure is provided. The composite laminated structure comprises a plurality of sub-laminate modules. Each sub-laminate module comprises: a first ply comprising fibers extending in a first orientation; a second ply comprising fibers extending in a second orientation; and an acute angle defined by the relative offset between the first orientation and the second orientation, the acute angle being less than 90° and defining an unbalanced structure of the sub-laminate module, wherein the first ply and the second ply are secured relative to one another in a non-crimped configuration.

In accordance with the purposes of the various embodiments as described herein, a composite laminate structure is provided. The composite laminate structure comprises a plurality of sub-laminate modules. Each sub-laminate module comprises: a first ply comprising fibers extending in a first orientation, the fibers of the first ply comprising a plurality of spread tows lying adjacent to each other; a second ply comprising fibers extending in a second orientation, the fibers of the second ply comprising a plurality of spread tows lying adjacent to each other; and an acute angle defined by the relative offset between the first and the second orientations, the acute angle being less than 90° and defining an unbalanced structure of the sub-laminate layer.

In accordance with the purposes of the various embodiments as described herein, a method of manufacturing a sub-laminate module for use in forming a composite laminate is provided. The method comprises the steps of: positioning a first ply in a first orientation; positioning a second ply in a second orientation, the second orientation being offset relative to the first orientation such that an acute angle less than 90° is defined; stacking the second ply adjacent the first ply such that an unbalanced structure is formed; and stitching the first ply and the second ply relative to one another in a substantially non-crimped configuration.

In accordance with the purposes of the various embodiments as described herein, a yet another method of manufacturing a sub-laminate module for use in forming a composite laminate is provided. The method comprises the steps of: spreading a first tow comprising a plurality of fibers to form a first ply layer; spreading a second tow comprising a plurality of fibers to form a second ply layer; positioning the plurality of fibers of the first tow in a first orientation; positioning the plurality of fibers of the second tow in a second orientation, the first and the second orientations defining an acute angle there between, the acute angle being less than 90° and defining an unbalanced structure of the sub-laminate layer; stacking the second ply layer and the first ply layer adjacent one another; and stitching the first ply layer and the second ply layer relative to one another in a non-crimped configuration.

In accordance with the purposes of the various embodiments as described herein, a method of manufacturing a composite laminate structure is provided. The method comprises the steps of: forming a plurality of sub-laminate modules, each module comprising: a first ply comprising fibers extending in a first orientation; a second ply comprising fibers extending in a second orientation; and an acute angle defined by the relative offset between the first orientation and the second orientation, the acute angle being less than 90° and defining an unbalanced structure of the sub-laminate module; stacking the plurality of sub-laminate modules adjacent one another; securing respective ones of the plurality of sub-laminate layers relative to one another in a substantially non-crimped configuration; and sequentially laying up the respectively secured plurality of sub-laminate layers so as to form the composite laminated structure.

In accordance with the purposes of the various embodiments as described herein, yet another sub-laminate module for use in forming a composite laminate is provided. The sub-laminate module comprises: a first ply comprising fibers extending in a first orientation; a second ply comprising fibers extending in a second orientation, the second orientation being offset relative to the first orientation; and an acute angle defined by the relative offset between the first orientation and the second orientation, the acute angle being less than 30°, wherein the first ply and the second ply are secured relative to one another in a non-crimped configuration.

BRIEF DESCRIPTION OF THE SEVERAL VIEWS OF THE DRAWING(S)

Having thus described various embodiments of the invention in general terms, reference will now be made to the accompanying drawings, which are not necessarily drawn to scale, and wherein:

DETAILED DESCRIPTION OF VARIOUS EMBODIMENTS

Figure 1:
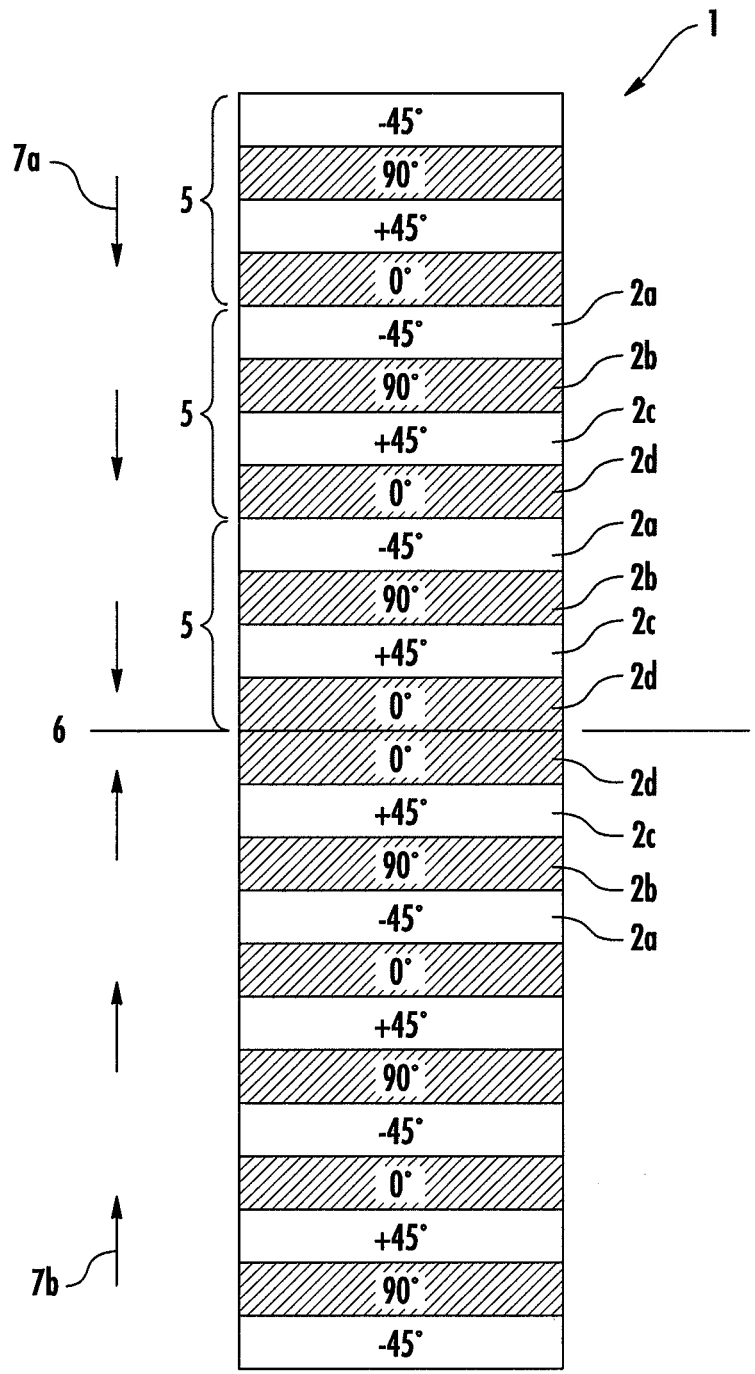
FIG. 1 illustrates a symmetric laminated structure according to the prior art.

Various embodiments of the present invention now will be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. Like numbers refer to like elements throughout.

Overview

In general, various embodiments of the present invention dispense with one or more of the various traditionally accepted constraints that govern laminate structure and the methods of making the same. Such constraints, as will be shown, often compromise the integrity and benefits of composite materials, while also rendering prediction of laminate strength extremely difficult, at best. Typical constraints include, but are not limited to: symmetry, balance, ply number, relatively large angles between plies, and the ten percent (10%) rule, as will be further described below.

Generally speaking "symmetry" requires that the layered composition of a laminated structure appear exactly the same when flipped or turned upon a mid-plane axis of the laminated structure. In this manner, symmetric laminated structures appear as a reflection, or mirror-image, of themselves, relative to their mid-plane axis. "Balance," while at least tangentially related to symmetry, further requires that for any number of individual layer orientations within the laminated structure, the orientations must always occur in pairs of positively (+) and negatively (−) oriented layers. In other words, for balance to exist, the number of positively oriented layers must always remain equal with the number of negatively oriented layers.

Still further, the requirement for balance within laminated structures, while desirable in the prior art, is valid only for a uniquely pre-defined set of reference axes; not for any other axes (e.g., it is not invariant). Balanced laminated structures may nevertheless remain beneficial for certain applications, such as those that will experience fully reversible loading (e.g. aircraft fuselages, because, for example, aircraft must be equally capable to make left and right turns), desiring to have uniform deflection and/or rotation in at least two opposing directions. Indeed, because balance is inherently required for fully reversible twisting moment and shear loading, the ply orientations may be manipulated and so selected in a manner to satisfy particular design criteria in this regard. However, in other various applications, one may only want to minimize deflection and/or rotation in one particular direction so as to not eliminate other potentially desirable (e.g., lift and the like) characteristics. In such alternative applications, unbalanced laminated structures may be preferable.

The "ply number" constraint arose as a result of the above-described concerns with symmetry and balance, as achievement of both requires a greater number of plies than could otherwise be used. Consider, for example, where four ply orientations are utilized when constructing a composite laminated structure, at least four ply layers would be so chosen to maintain balance, while at least eight ply layers would be necessary to achieve symmetry. In conjunction with such ply number constraints, conventional laminated structures are still further constrained by a ten percent (10%) rule. As such is commonly defined and referred to in the art, this rule requires that each ply orientation must comprise at least ten percent of the total laminated structure. As a non-limiting example, a [0°/±45°/90°] laminated structure so constrained may comprise twenty (20) plies, sixteen (16) of which are oriented at ±45°. For such this laminate structure to comply with the 10% rule, precisely two of the remaining four plies must be oriented at 0°, with the still remaining two oriented at 90°. Thus, such a laminate would be 10% at 0°, 80% at ±45°, and 10% at 90°. As may be seen, the 10% rule alone significantly impacts the minimum thicknesses or gauge of such laminated structures, along with their minimum ply number necessary to achieve balance and/or symmetry. Such minimum gage may be often dictated not only by the anticipated load-carrying requirement, but also by considerations of handling, effective stiffness, or other nonstructural requirements, as may be suitable for a particular application.

In a variety of applications, and in particular for highly loaded structural applications, where the weight, thickness, and integrity of laminated structures are invariably critical design factors, conventional constraints such as those identified and described above oftentimes prove burdensome. In response, various embodiments of the present invention dispense with one or more of these constraints, comprising instead asymmetric and unbalanced structural characteristics that may result in a degree of bend-twist coupling, at least with regards to individual sub-laminate modules, as will be further defined below. The bend-twist coupling provides a reliable and predictable mechanism for controlling the deflection exhibited by a structure in response to combined bending and twisting forces.

Due to their aforementioned asymmetric and unbalanced nature, certain embodiments further result in improved homogenization with fewer plies, often critical when seeking to minimize weight and thickness without sacrificing structural integrity. Improved homogenization, as will be described in further detail below, facilitates convenient calculation of combined effect strength of the laminated structure and maintaining constant material properties when tapering. In these and still other various embodiments, the number of ply orientations is minimized within the laminated structure by disposing with conventional requirements such as the four ply angles and the ten percent (10%) rule. As a result, these and other embodiments provide a faster, more efficient, and less error prone laminate formation process, oftentimes utilizing sub-laminate modules, which in turn still further improve the design and stacking processes for tapered structures.

Such sub-laminate modules, as will be described in further detail below, generally comprise a pre-defined set or group of individual ply layers having multiple ply-orientations. The sub-laminate modules may be supplied in dry form, or alternative, in pre-preg form, as will be described further below. Each sub-laminate module, though involving multiple single ply-orientations, is treated as a single unit for purposes of assembly of finished laminate product. In this manner, as will be described in further detail below, the sub-laminate modules function as basic building blocks for assembly of finished laminated products. The sub-laminate modules may comprise any of a variety of desired number of ply layers, provided they contain multiple ply orientations. However, it is desirable to minimize the number of ply layers within respective sub-laminate modules, as will be described in further detail below.

Various embodiments of the present invention may also comprise unbalanced structural characteristics. In these and other embodiments, which may or may not incorporate certain features as described above, the selection of particular ply angle orientations aids with structural stiffness and strength. Predictability of such parameters is improved, as at least certain embodiments select ply orientation in which the resulting deformations from imposed combined bending and twisting moments are controllable, a feature not present in balanced (e.g., orthotropic and/or isotropic) structures.

Each of these features, along with their respective benefits, will be described in further detail below, with reference to representative figures, as necessary.

Asymmetrical Structural Characteristics

Turning initially to FIG. 1, a symmetric laminated structure 1 according to the prior art is illustrated. As may be best understood from this figure, the symmetric laminated structure 1 is generally constructed with at least a four-ply orientation, incorporating orientations of −45°, 0°, +45°, and 90°. The four-ply orientation of the illustrated structure 1 is realized by the relative orientations of sequential ply layers 2a, 2b, 2c, and 2d. This sequence of plies, in at least the illustrated exemplary embodiment, is repeated three times above and below the mid-plane 6, as will be described in further detail below. Alternative, three-ply orientations are also commonplace, and such generally dispensed with the 90° orientations in favor of a 0°, +45°, −45° oriented configuration. Notably though, such configurations always maintain balance with an equal number of positively (+) and negatively (−) oriented layers, and such remains a common industry practice. Such configurations further maintain symmetry by stacking the ply layers 2a, 2b, 2c, and 2d in two ply group orientations 7a, 7b, each centered about a mid-plane axis 6 of the formed structure 1. In this manner, when fully formed, the ply layers appear as mirror images of one another, relative to the mid-plane axis 6, thereby maintaining symmetry, as previously described. For certain applications, sub-laminate modules 5, of the type previously described here, may be incorporated within the symmetric laminated structure 1, each generally including at least four ply layers, namely 2a, 2b, 2c, and 2d. Of course, it should be understood that other prior art configurations (not shown) oftentimes include sub-laminate modules having eight (8) to ten (10), or more, ply layers, as may be necessary to achieve not only balance, but also symmetry. Such constraints, as may be expected, often result in relatively thick laminated structures at an unnecessarily higher thickness to carry the load.

Figure 2:
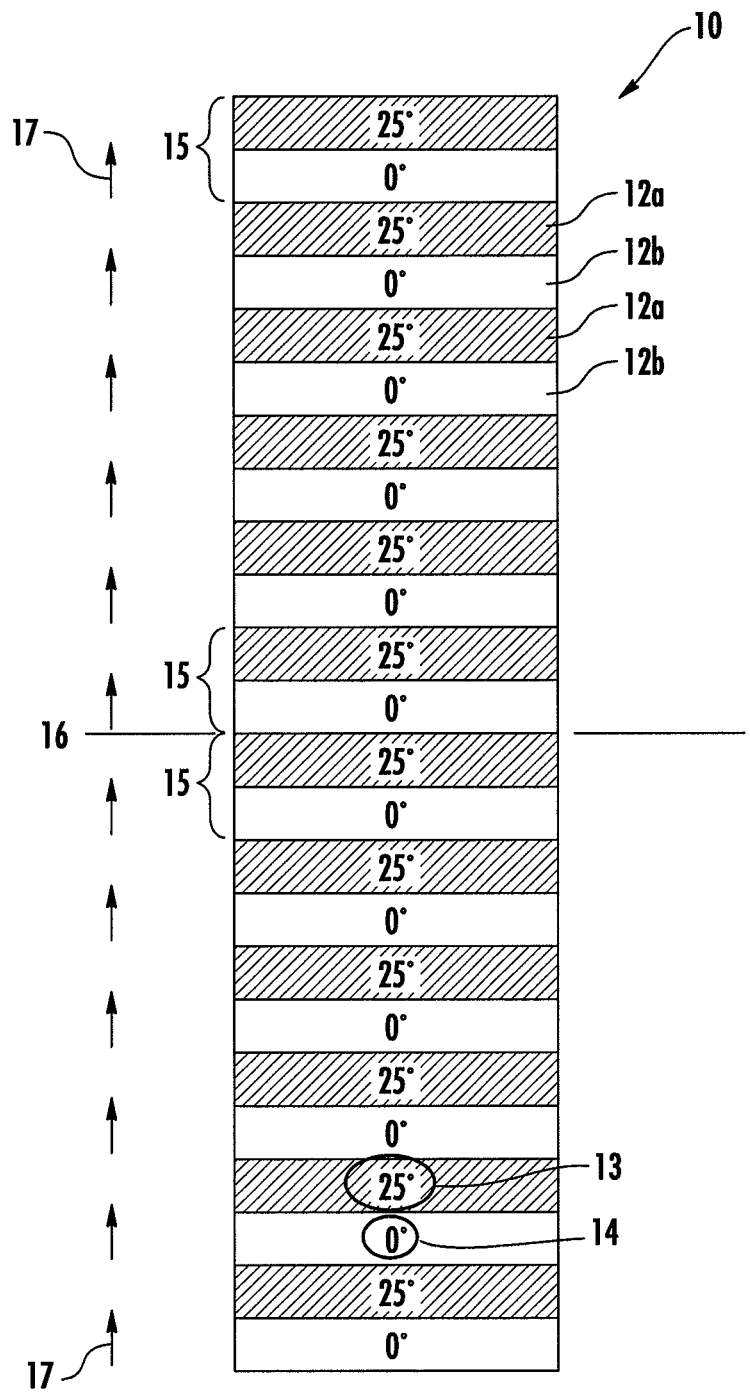
FIG. 2 illustrates an asymmetric, unbalanced laminated structure 10 according to various embodiments.

Turning now to FIG. 2, an asymmetric, unbalanced laminated structure 10 according to various embodiments is illustrated. As may be best understood from this figure, the laminated structure 10 may, in certain embodiments, comprise a plurality of first ply layers 12a, a plurality of second ply layers 12b, a first orientation 13 (see also FIG. 3), and a second orientation 14 (see also FIG. 3). The plurality of first ply layers 12a are, according to certain embodiments, separated by respective ones of the plurality of second ply layers 12b. Each of the plurality of second ply layers 12b are indicated in FIG. 1 without any marks, so as to distinguish them from the diagonally-oriented marks on each of the plurality of first ply layers 12a.

Each of the plurality of first ply layers 12a of FIG. 2 may be, according to various embodiments, oriented in the first orientation 13 (see also FIG. 3) relative to each of the plurality of second ply layers 12b. Each of the plurality of second ply layers 12b may be, in turn, oriented in the second orientation 14, as will be described in further detail below with reference to at least FIG. 3. In this manner, a ply angle 19 (see FIG. 3) may be formed between the respective orientations of the first and second ply layers, such that the ply angle corresponds to an angular shift there-between. In at least the illustrated embodiments, the ply angle 19 is 25°, while in other embodiments the ply angle 19 may be in a range of from about 10° to 40°, as may be desirable for a particular application. In other embodiments, the range may be from about 15° to 30°, depending upon a desired result for of the bend-twist coupling, as will be described in further detail below. The shear coupling component of the bend-twist coupling generally reaches a maximum value around a 30° ply angle. In still other embodiments, it should be understood that the ply angle 19 may be any of a variety of acute angles (e.g., less than) 90°, as will be described in further detail below with regard to various unbalanced and unbalanced structural characteristics of the laminated structure 10. Still further, according to various embodiments, the ply angle 19 may be a continuous variable, meaning that ply angle values are not limited to being discrete integer values.

The laminated structure 10, like laminated structures 1 of the prior art, may according to various embodiments further comprise a mid-plane axis 16. In certain embodiments, as illustrated in at least FIG. 2, the stacked first and second ply layers 12a, 12b, need not be symmetrical about the mid-plane axis 16. In other words, as previously noted, the plurality of first ply layers 12a are each separated by respective ones of the plurality of second ply layers 12b, throughout the entirety of the laminated structure 10. In contrast, as best understood from comparing FIGS. 1 and 2, at least two of the plurality of ply layers 2d are positioned directly adjacent one another (e.g., not separated by any of the remaining ply layers 2a, 2b, and/or 2c). In this manner, the stacked first and second ply layers 12, 12b are generally configured according to various embodiments in an asymmetrical configuration.

Returning to FIG. 2, the laminated structure 10 according to various embodiments may be stacked in a single orientation 17. In comparison to the heterogeneous prior art laminated structure 1 of at least FIG. 1, in which the ply layers must be stacked in two orientations 7a, 7b such that it remains centered about a mid-plane axis 6, the ply layers 12a, 12b of the laminated structure 10 may be stacked in sequential order without regard to their orientation or their relative positioning of the mid-plane axis 16. In certain embodiments, as will be described in further detail below, while the ply layers may not be individually sequentially stacked, sub-laminate modules (see FIG. 2 and later description herein), each comprising two or more ply layers are themselves sequentially stacked. Because individual sub-laminate modules may be stacked sequentially in this regard, such a configuration provides a significant cost advantage, as compared to the labor and time intensive process required by the symmetrical configuration of the prior art, and creates a homogenized structure. The ability to sequentially stack the ply layers (or sub-laminate modules, as described further below) likewise minimizes the risk of errors when laying the plies themselves, while also facilitating much easier tapering and ply dropping procedures, as will also be described further below.

Contributing further to cost advantages, the laminated structure 10 according to various embodiments may further comprise a plurality of sub-laminate modules 15, as previously defined and described herein. Each of the sub-laminate modules 15, as depicted in at least FIG. 2, may generally comprise at least one first ply layer 12a and one second ply layer 12b, each generally having a different orientation, as described elsewhere herein. In certain embodiments, the sub-laminate modules 15 form the basic building blocks for forming the laminated structure 10 and are, in this manner, generally treated as singular units during the manufacturing process. In other words, as the building blocks, the sub-laminate modules 15 according to various embodiments may be pre-assembled, permitting them to be stacked directly atop one another via a "one-axis layup" process that may substantially minimize reconfigurations.

In at least those embodiments comprising sub-laminate modules 15 as depicted in FIG. 2, the "one-axis layup" may be up to seven (7) times faster than the conventional four-axis layup employed with prior art laminated structures 1, although it should be understood that varying degrees of improved efficiency may be realized, as may be desired for a particular application. Alternative embodiments, as will be described in further detail below, may involve rotating (e.g., flipping or folding) every other sub-laminate module 15 to form a balanced laminate (e.g., a [0°/±ply angle 19/0°] configuration), which achieves a fully reversible twisting moment or sheer loading (e.g., having magnitudes from −1 to +1), as may be desirable for a particular application. In this manner the basic building block, namely each sub-laminate module 15 may be used according to certain embodiments not only to form unbalanced laminated structures as shown in FIG. 2, but also balanced laminated structures, both via a one-axis layup process. In still additional embodiments, when the ply angle 19 is 45°, as in the sub-laminate module [0/45], the sub-laminate module 5 may be flipped and rotated into a [−45/90] configuration. By stacking these two sub-laminates (one rotated and the other not) according to various embodiments, a quasi-isotropic laminated structure of [0°/±45/90°] may be obtained. Such a configuration may be formed, according to certain embodiments via a "two-axis layup" since at least one of the sub-laminate modules is rotated by 90 degrees. It should be understood, however, that in either of these and still other embodiments, such layup processes generally achieve relatively comparable and desirable efficiencies at least in part by avoiding "off-axis layups" (e.g., layups at +ply angle 19 or −ply angle 19 orientations).

Figure 3:
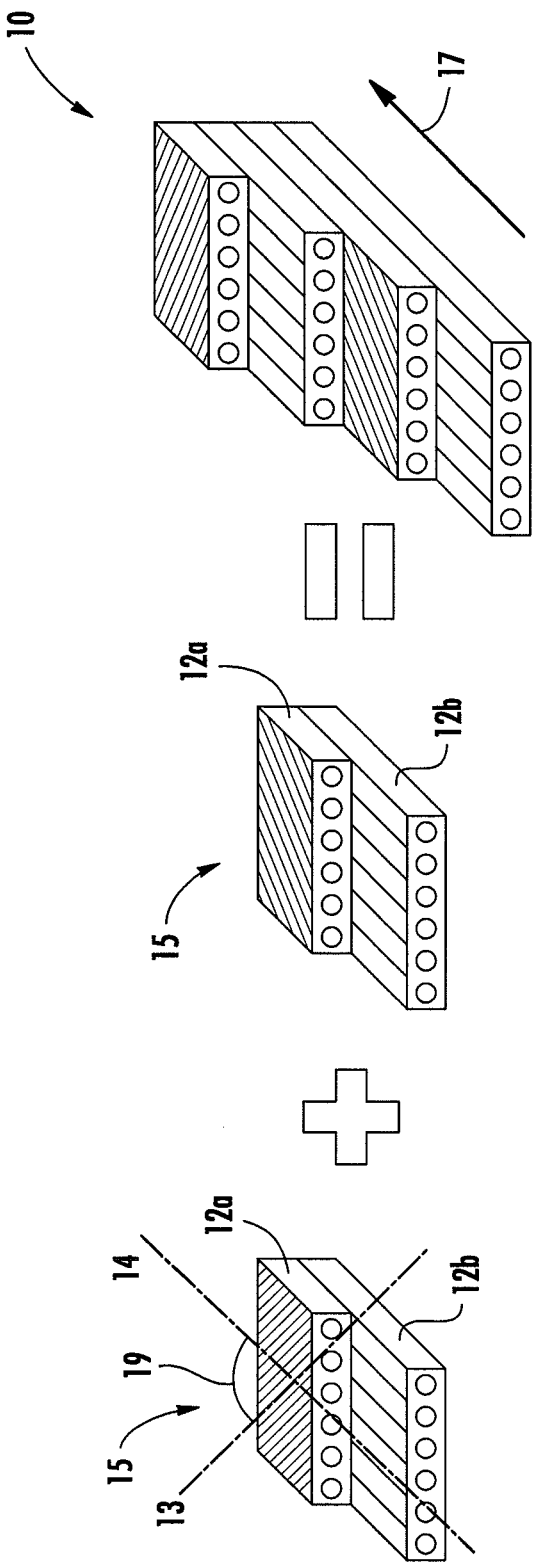
FIG. 3 illustrates an exemplary formation of the laminated structure of FIG. 2 from at least two sub-laminate modules 15.
Figure 10:
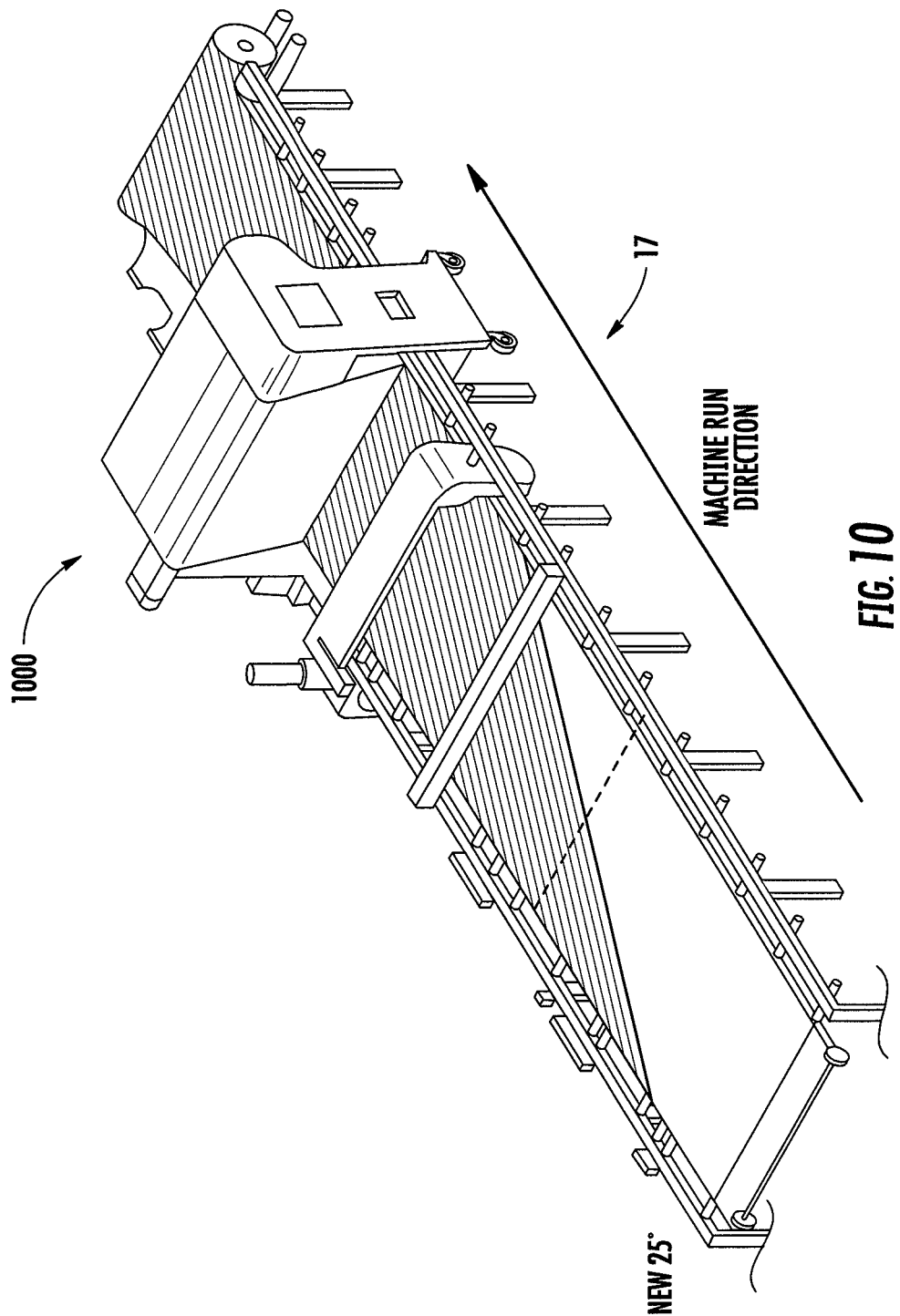
FIG. 10 illustrates a modified machine for manufacturing the asymmetric laminated structure of FIG. 1.

With particular reference to FIG. 3, the formation, according to various embodiments, of an exemplary laminated structure 10 from at least two sub-laminate modules 15, is illustrated. Upon the left of FIG. 3, a first module 15, comprising a single first ply layer 12*a* and a single second ply layer 12*b*, are illustrated. A machine 1000, as generally understood from at least FIG. 10 to have a machine direction 17, may be aligned with an overall axis of the sub-laminate module 15. In certain embodiments, the machine direction 17 may be along a 0° axis corresponding to an axis of at least one ply layer (e.g., the second ply layer 12*b* of FIG. 3), which further improves the cost and efficiency advantages of such modules 15. Such a machine direction 17 would typically result in a [0/25] machine configuration for those embodiments having a ply angle 19 of 25°. It should be understood, however, that in other embodiments, the machine direction 17 need not be oriented along a 0° axis, as may be desirable for a particular application. As a non-limiting example, the machine direction 17 may be configured along a 60° axis, resulting in a [60/85] machine configuration for at those embodiments having a ply angle of 25°. Most notably, it should be understood that the difference between the configuration angles, regardless of their respective values, will according to various embodiments substantially correlate to the desired ply angle 19.

As may also be understood from FIG. 3, the first module 15 may be combined with a second module 15, likewise comprising single first and second ply layers 12*a*, 12*b*. The resulting laminated structure 10 may be thus formed, according to certain embodiments, by sequentially stacking respective modules 15, each having at least one common axis aligned with the run direction 17. Although at least the illustrated modules 15 comprise two distinct ply layers, in other embodiments, it could be envisioned that the modules may comprise two or more layers of each respective ply layer 12*a*, 12*b*. However, it should be understood that the thickness of modules 15 should generally be minimized, and those comprising two distinct ply layers 12*a*, 12*b* provide the highest degree of flexibility and efficiency throughout the layup (e.g., stacking) process, as will be described in further detail below.

Various embodiments of the sub-laminate modules 15 may, as has been previously discussed be pre-formed (e.g., stitched) and comprise at least one first and one second ply layer 12*a*, 12*b*. As may be further understood from at least FIG. 3, a further advantage of such modules 15 is their ability to be rotated (e.g., flipped and/or folded) about their at least one common axis aligned with the run direction 17 (as illustrated, the axis of second ply layer 12*b*, which is, as a non-limiting example, a 0° axis). In this manner, for those embodiments seeking to maintain balance, as will be described in further detail below, sub-laminate modules 15 may be flipped, or alternatively, merely folded relative to this axis such that the axes of the respective first ply layers 12*a* are positively (+) and negatively (−) oriented, respectively. As a non-limiting example in which the first ply layers 12*a* are oriented at a 25° angle, folding or rotating a sheet of sub-laminate onto itself would result in a first ply layer oriented at a −25° angle, thereby preserving the overall balance of an ultimately formed laminated structure 10 with a [0/+25°/−25°/0] configuration, as may be desirable for a particular application.

It should be understood that in certain of these embodiments having rotated modules, any stitching of ply layers within the modules (as will be further described below) may occur prior to any such flipping or folding of a sheet, with any necessary stitching of the two rotated modules occurring thereafter. Of course, it should also be understood that certain embodiments may not require balance, in which case only positively (+) (or, alternatively, only negatively (−)) oriented ply layers 12*a* may be utilized. As such, rotation (e.g., flipping or folding) of the sub-laminate modules 15 may, in at least these embodiments, be unnecessary or even undesirable. Still further, in yet other embodiments, it may be desirable for a majority of the sub-laminate modules 15 to remain unbalanced, while the overall laminated structure formed thereby is, as a whole, balanced, by rotating (e.g., folding or flipping) a certain percentage of the modules, as previously described herein.

It should be noted that according to those various embodiments comprising the sub-laminate modules 15, the above-described layup (e.g., stacking) benefits similarly apply when seeking to create tapered surfaces upon an ultimately formed laminated structure 10. With reference to FIG. 1, it may be seen that creating a tapered surface on the laminated structure 1 of the prior art, having its multiple ply layers, multiple layer orientations, and mid-plane symmetry, would be not only time and labor intensive, but also extremely error-prone. In particular, if a "top" layer ply were dropped, a "bottom" layer ply would also need to be dropped to maintain symmetry; yet dropping nothing further would result in an unbalanced structure. Still further, dropping nothing further would inherently alter the structural composition of the laminated structure 1, potentially adversely impacting strength characteristics associated therewith. As such, additional ply layers would need to be dropped, oftentimes limiting the length and degree of taper achievable.

Further considerations were also necessary when tapering conventional structures, particularly with regard to the relative order in which respective plies are dropped, together with the distance that must be maintained between successive drops. In contrast, tapered surfaces may be formed in certain embodiments of the laminated structure 10 by merely dropping successive sub-laminate modules 15, individually or in multiples, as may be desirable for a particular application. Being homogenized, as will be described further below, sub-laminate module 15 drops may be located at the outside, the tool side, or the inside of the laminate, without regard to symmetry. For those structures having at least sixteen (16)

sub-laminate modules 15 (as describe further below), each module may be dropped in 0.125 millimeter steps, with the total distance between successive drops being 1.0 millimeter. Taper drops in these and other embodiments may further be linear, non-linear, one or two dimensional, and/or square-cornered, each of which at least in part contributing to a reduction in the degree of ply waste otherwise conventionally encountered with angular-oriented ply drops.

Still further, regardless of the location or number of sub-laminate modules 15 dropped, the structural composition of the laminated structure 10 remains the same throughout the process. For a heterogeneous laminate like that in FIG. 1, as opposed to a homogeneous (as will be described further below) laminate like that in FIG. 2, every ply drop, for example, the removal of the outermost ply of −45°, will change the inherent composition of overall laminated structure. As individual plies are dropped as tapering proceeds, the laminate thickness and its properties will change. Conventional heterogeneous laminate designs like that in FIG. 1 generally avoid such changing laminate characteristics by dropping multiple ply layers in precise succession over precise lengths of ply tows, all of which results in less than optimal tapering processes. In contrast, when a laminated structure 10 according to various embodiments as illustrated in at least FIG. 2 is tapered, each successive ply drop can take place at any location, with the remaining laminated structure being structurally unchanged. In other words, in at least certain embodiments, the overall laminated structural characteristics do not vary along a length of ply, even without the conventionally necessary complex tapering processes.

Figure 4:
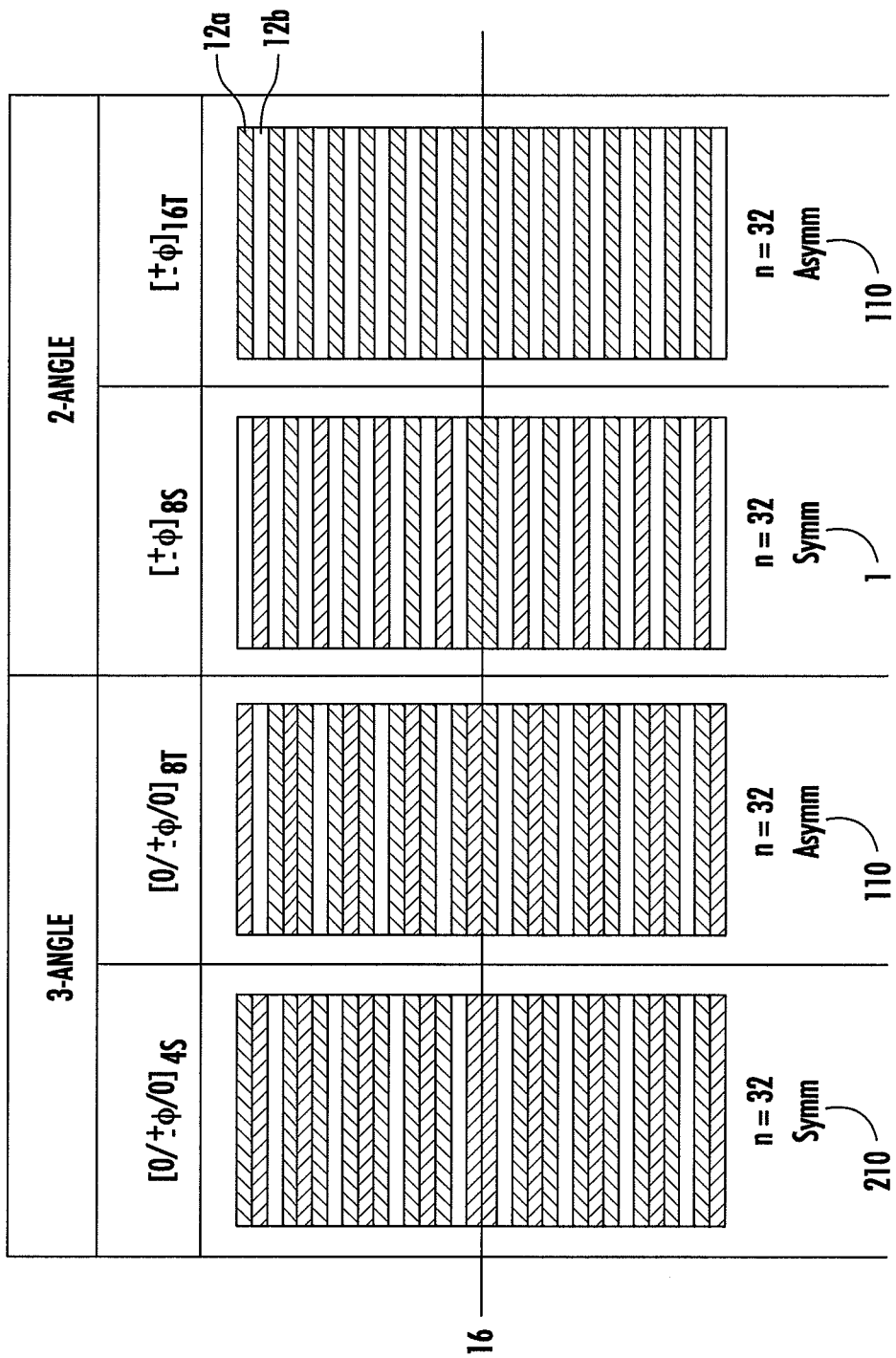
FIG. 4 illustrates a degree of homogenization achievable by laminated structures configured similar to those of FIG. 2.

Turning now to FIG. 4, with continued reference to FIG. 1, an additionally related advantage of the asymmetrical laminated structures 10 is illustrated, namely the homogenization, which amongst other things, facilitates the previously-described tapering procedures. In particular, various embodiments of bi-angle and tri-angle laminated structures 10, 110 are illustrated in FIG. 4 substantially adjacent respective prior art laminated structures 1, 210. Tri-angle laminated structures 110 may be configured substantially the same as previously described herein with regard to bi-angle laminated structures 10, but with the distinction that the structures 110 according to various embodiments incorporate the previously described "folded configuration" of the module 15, so as to maintain balance, where such may be desirable. However, it should be understood that in still other embodiments, the tri-angle laminated structures 110 may be configured substantially different in part or in whole, as compared to the structures 10.

Returning to FIG. 4, as a non-limiting example, comparing structure 110 relative to structure 1 reveals the former's improved homogenization when viewed as a whole. Indeed, according to certain embodiments, repeated alternation of the ply layers 12a, 12b approaches complete homogenization. From a practical perspective, complete homogenization means that the structure's structural strength characteristics, among other properties, may be predicted, manipulated, and calculated with regard to the laminated structure as a whole. In contrast, for heterogeneous structures in the prior art, such characteristics had to be dealt with on a ply-by-ply basis, resulting not only in errors and inefficiencies, but also potential compromises to the structural integrity, as was previously described with regard to prior art tapering procedures.

The two-angle embodiment of FIG. 4, approaches complete homogenization with as few as thirty-two (32) repetitions (e.g., 32 individual ply layers). In those embodiments comprising sub-laminate modules 15, homogenization may be achieved with as few as sixteen (16) modules (notably, still 32 individual ply layers). It should be understood, however, that still other embodiments may be envisioned with any number of repetitions required for homogenization, provided such remain relatively thin and cost advantageous relative to the prior art laminated structures 1. In this regard, it should be understood that various embodiments of the present invention, based at least in part upon their sub-laminate modules and unbalanced bi-angle configurations, achieve complete homogenization with much thinner laminated structures that otherwise available in the prior art due at least in part to previously described constraints.

As will be described in further detail below in the portion describing non-crimp fabric, the ply layers 12a, 12b may, according to various embodiments be formed from a variety of materials and in a variety of manners. In at least certain embodiments, however, the ply layers 12a, 12b may have a thickness that is at least less than that of ply layers of conventional laminated structures 1 (e.g., 2a, 2b, 2c, 2d), although such distinctions in thicknesses are not illustrated specifically in the various figures. Such thinness of ply layers 12a, 12b further enables the structure 110 to achieve full homogeneity with the number of module and/or ply layer repetitions, as described above.

As a non-limiting example, and as will be described in further detail below, the ply layers 12a, 12b may each have a thickness of approximately 0.0625 millimeters, which further gives them a weight of approximately 75 g/m². Of course, thinner or thicker and/or heavier or lighter ply layers 12a, 12b may be envisioned in still other embodiments, depending on any of a variety of considerations, such as homogeneity, as may be desirable for a particular application.

Figure 5:
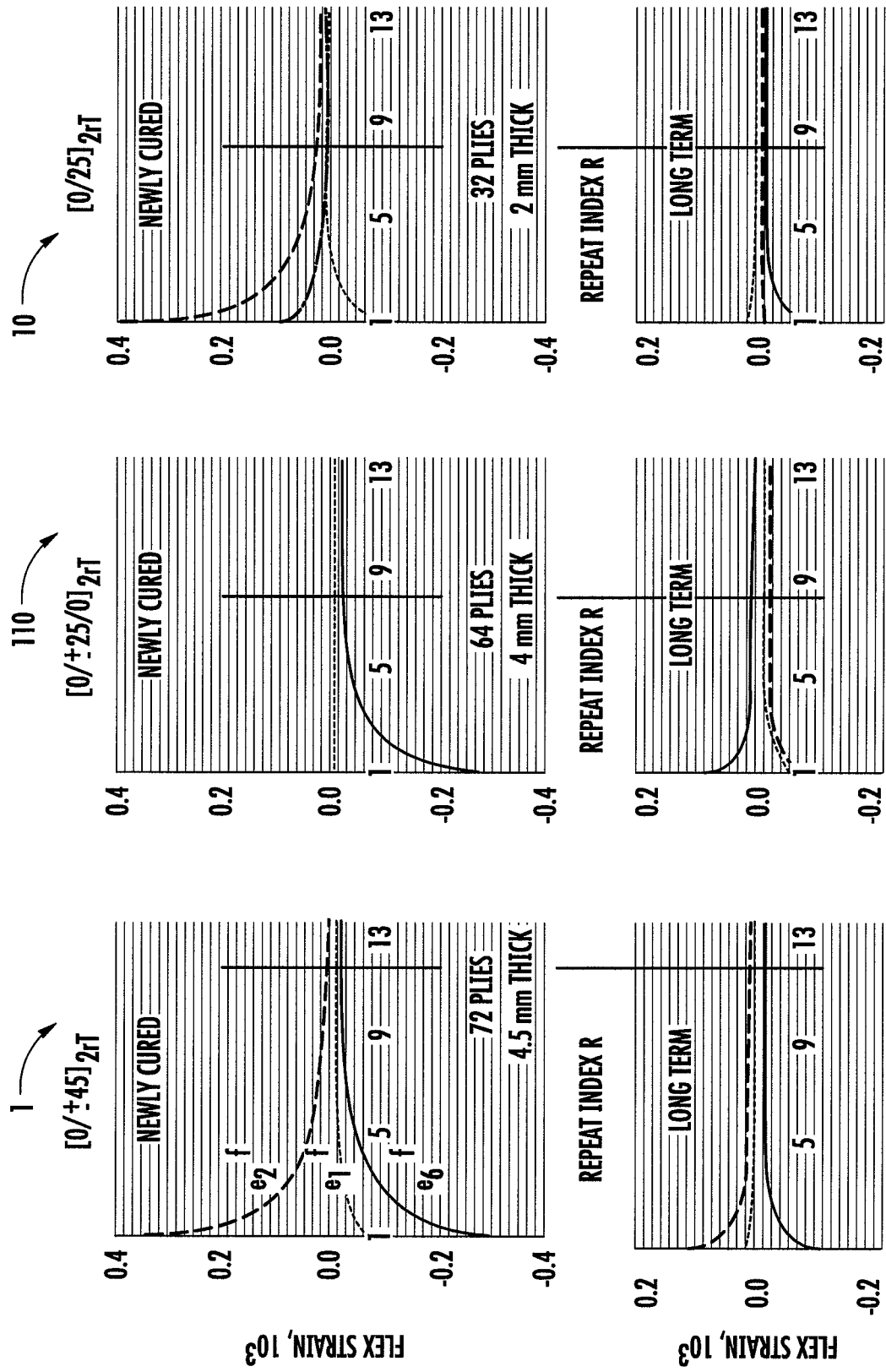
FIG. 5 is a graph illustrating a reduced degree of warping between the laminate 1 of FIG. 1 and the laminated structure 10 of FIG. 2.

Turning now to FIG. 5, yet another advantage of the asymmetrical laminated structures 10, 110, and in more particularly, the homogenization thereof, is illustrated. In particular, various embodiments of bi-angle and tri-angle laminated structures 10, 110 exhibit a decreased degree of flex strain (e.g., warping), largely due to curing over time, than exhibited by prior art laminated structures 1, as also illustrated. As initial background, the prior art laminated structure 1 is notated as [0/±45°], which following the previously described constraints would require ply orientations of 0°, +45°, and −45°. The tri-angle laminated structure 110 is notated as [0/±25°/0], which similarly maintains a balance of +25° and −25° plies. The bi-angle laminated structure 10 is notated as [0/25°], which results in the unbalanced characteristics, as previously described herein.

In certain of these and still other embodiments, the degree of flex strain or warping, in the long term approaches zero when a laminate structure contains a sufficient number of ply layers. This relationship is further tied to the degree of homogenization, which corresponds roughly to the strain or warping approaching zero. As best understood from the left-most column of FIG. 5, the prior art laminated structure 1 has been known to exhibit minimal warping with at least 72 ply layers having a total thickness of 4.5 millimeters. The tri-angle laminated structure 100 (middle column of FIG. 5) exhibits improved characteristics, achieving minimal warping with approximately 64 ply layers having a total thickness of 4.0 millimeters. In contrast, the laminated structure 10, as illustrated in the right-most column of FIG. 5, achieves comparable characteristics with those of the prior art and tri-angle laminates, but with merely 32 ply layers (or, alternatively, 16 sub-laminate module layers), and an overall thickness of approximately 2.0 millimeters. Thus, fewer ply angles and/or thinner plies in sub-laminates according to various embodiments enable a laminated structure to be homogenized in a smaller total thickness than previously achievable.

Further, considering homogenization, prior art laminated structures 1 require many more comparable ply layers, up to 72 plies, to substantially eliminate warping. Such high ply counts are primarily due to the previously described symmetry, balance, and 10 percent rule constraints, requiring such laminates to have sub-laminate modules of six or more plies each (e.g., two or more each of 0°, +45°, and −45°). Because flex strain or warping is minimized with the exemplary approximately twelve (12) sub-laminate modules, such results in the afore-mentioned 72 individual plies. Laminated structure 10 overcomes deficiencies in this regard by reducing the size of its sub-laminate modules 15 to two (versus six) ply layers, resulting in minimal flex strain or warping with a mere 16 sub-laminate modules, or 32 ply layers. In this manner, the laminated structure 10 may, according to various embodiments, have a total thickness less than half that of conventional laminated structures 1. In at least the illustrated embodiment, the relative thicknesses are approximately 2.0 millimeters and 4.5 millimeters, although in still other embodiments, various relative thicknesses may be envisioned. Without such six or more-ply sub-laminate modules, such relatively thin laminated structure thicknesses are feasible in this, and still other embodiments, by utilizing a form of non-crimp fabric, which is in certain embodiments itself further spread and thinned by, for example, mechanical processes, as will be described in further detail below.

Unbalanced Structural Characteristics

As may be understood from at least FIG. 3, each of the plurality of first ply layers 12a may be, according to various embodiments, oriented in the first orientation direction 13 relative to each of the plurality of second ply layers 12b, which may be oriented in the second orientation direction 14. In this manner, the relative orientations of the first and the second ply layers 12a, 12b define a ply angle 19, which may be varied, as will be further described herein to achieve certain desirable structural characteristics. Such manipulation of the ply angle 19 may, according to various embodiments, substantially minimize long-term risks of deflection, rotation, and buckling of composite materials formed from sub-laminate layers 110 formed from such ply layers 12a, 12b.

Returning for a moment to FIG. 2, for context, it should be understood that in conventional laminated structures 1, maintaining a balance of positively (+) and negatively (−) oriented ply layers, or rather an equal number of positive and negative ply angles 19, was considered critical. Such configurations, as commonly known and understood in the art, create orthotropic and/or isotropic structures, each of which exhibit inherently "uncoupled" bending and twisting deformations. Laminated structures having uncoupled bend-twist, while traditionally preferable for their analogous properties with previously used metals (e.g., aluminum), substantially fail to take advantage of the dynamic relationship that exists between the bending and twisting motions that may be experienced by such structures. The dynamic relationship is oftentimes referred to as the "bend-twist coupling" in a variety of applications, or "aero elastic tailoring" in at least aerospace and wind turbine related applications. In any of these and still other embodiments, it should be appreciated that at least the shear coupling component of the bend-twist coupling generally reaches a maximum value around a 30° ply angle.

As a non-limiting example of the "uncoupled" twisting of conventionally "balanced" laminated structures, consider the laminated structure 1 of the type illustrated in at least FIG. 1. As may be understood at least in part from FIG. 6A, if the structure 1 was subjected to a bending force (e.g., P), the structure will only exhibit bending behavior. No angle of twisting (e.g., twisting behavior) would be introduced, although such acts in "unbalanced" structures to minimize the degree of deflection imposed by the bending alone or even combined bending and twisting, as will be described in further detail below. Likewise, subjecting the laminated structure 1 to a wholly twisting force (e.g., T), as may also be understood at least in part from FIG. 6A, will result in only twisting behavior, due to the "uncoupling" or absence of the bend-twist relationship that might otherwise have dampened or at least partially offset the imposed shear.

In stark contrast to such balanced configurations of the conventional laminated structures 1, the laminated structure 110 according to various embodiments is intentionally unbalanced in nature so as to take advantage of the aforementioned dynamic relationship between the bending and twisting motions of the laminate structure. In certain embodiments, it should be understood that, alternatively, at least the sub-laminate modules 15 (see FIG. 3) are so intentionally unbalanced to achieve these benefits, the laminated structure 110 may be balanced, as desirable for a particular application, as previously described herein. In at least those unbalanced or balanced embodiments, the laminated structure 110 may incorporate at least one acute ply angle 19. In certain embodiments, the acute ply angle 19 may be approximately + or −25°, while in other embodiments the ply angle 19 may be in a range of from about 10° to 40° or, alternatively from about 15° to 30°, as may be desirable for a particular application. In at least those unbalanced embodiments, the acute ply angle 19 may be any of a variety of angles between 0° and 90°, while in at least those balanced embodiments, the acute ply angle is generally less than 45°.

Returning again to FIGS. 6A and 6B, the bend-twist coupling may be further understood, as generally referred to as a coefficient Z. The coefficient Z according to various embodiments may be defined and measured analytically by the incremental change in a twist angle relative to a bend angle, each of which may be understood from viewing the three sequential illustrations of FIG. 6A. Indeed, as a non-limiting example illustrated by at least the furthest right illustration of FIG. 6A, application of both a bending force P and a torsion force T upon the laminate structure 110, may, according to certain embodiments, result in a minimal degree of deflection, even 0°, depending upon the inherent ply angle 19 and structural material of the structure 110, as will be described in further detail below. In any of these and still other embodiments, the shear coupling component of the bend-twist coupling generally reaches a maximum value around a 30° ply angle.

Figure 6B:
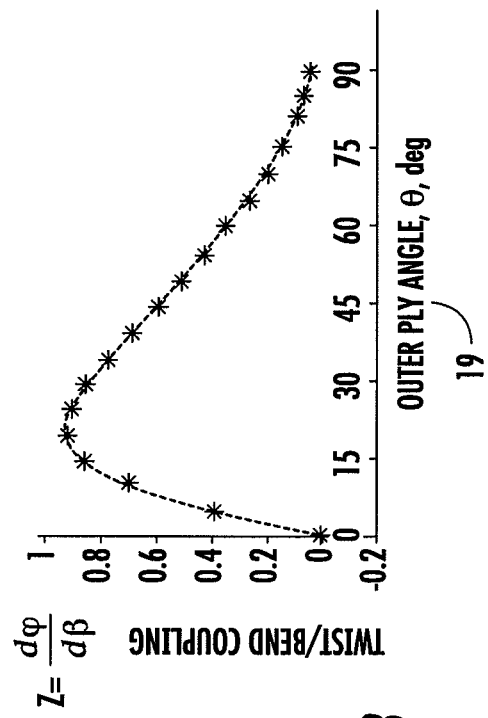
FIG. 6B is a graph illustrating a variety of bend-twist coupling values, relative to an unbalanced angle of at least one ply of the asymmetric laminated structure of FIG. 1.
Figure 6A:
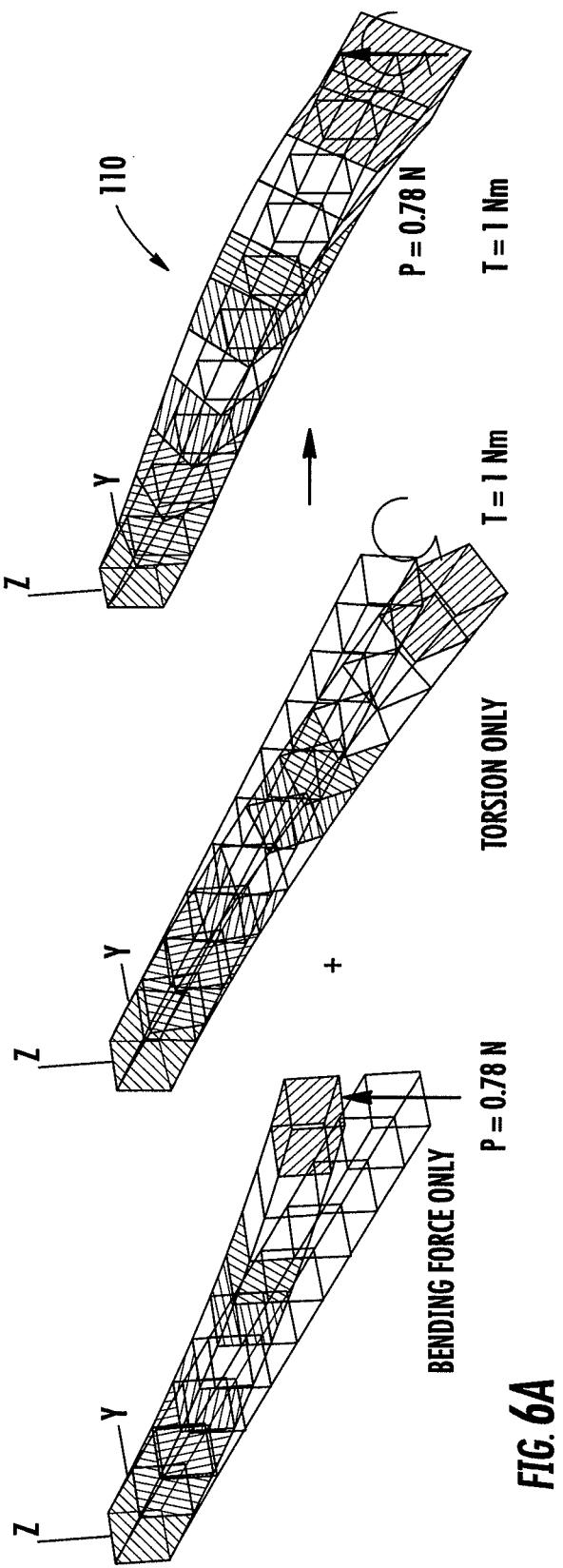
FIG. 6A illustrates an unbalanced laminate according to various embodiments encountering a bending and a twisting force.

With particular reference to FIG. 6B, it should be understood that according to certain embodiments of the laminated structure 110, as the "unbalanced" (e.g., as described previously herein) ply angle 19 approaches a relatively narrow angle of less than or equal to 25°, the effect of the coupled bend-twist coefficient Z may be further realized. In other words, the degree of combined deflection, created by both bending and twisting motions imposed upon the structure 110 may be manipulated to substantially counteract one another (e.g., "zero out"), as may be desirable for a particular application. In other embodiments, it should be understood that alternative, yet still relatively narrow ply angles 19 (e.g., the non-limiting examples of 10° to 40° or 15° to 30°) may be desirable, although they do not involve completely counteracting forces. However, in certain embodiments, such ply angles 19 may prove advantageous by providing a predictable and reliable degree of desired deflection or rotation, as may be beneficial for a particular application.

Figure 7:
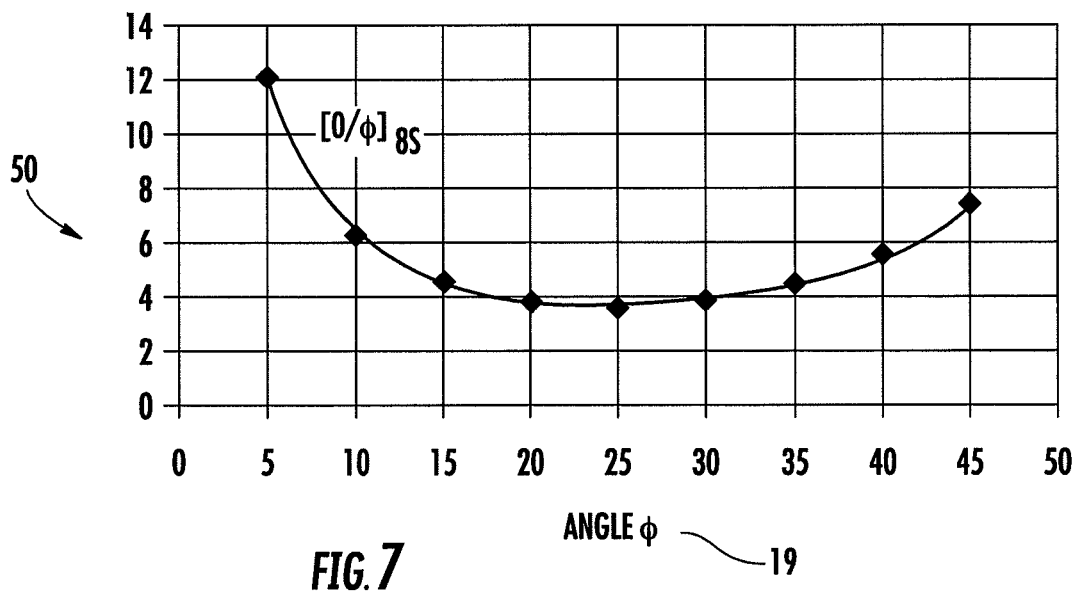
FIG. 7 is a graph illustrating an exemplary cantilevered unbalanced panel that would result in minimal, even zero, deflection values with various ratios of applied combined twisting and bending movements.

Turning now to FIG. 7, for purposes of a non-limiting example, it may be seen that certain narrow and unbalanced ply angles 19 minimize the degree of deflection 50 experienced by the laminated structure 110 in response to applied bending and twisting forces. As may be seen, as the ply angle 19 approaches approximately 25°, the deflection 50 is minimized. The mathematical predictability of such behavior, by pre-selection of particular ply angles 19 may prove critical in certain applications such as, for example, the manufacture and construction of laminated structures 110 for use in long thin structural applications, such as wind turbine blades, helicopter rotor blades, airplane wing surfaces, or the like. As a non-limiting example, minimizing deflection may enable operation of such "long and thin" blades closer to the towers upon which they are erected, saving material costs, increasing velocity, and contributing to increased turbine megawatt output. As another non-limiting example, minimizing and/or varying the degree of "tip" deflection 50 may prove critical in aerospace and wind turbine related applications, wherein a precise deflection of a craft's wing may significantly impact and/or alter the lift forces, drag forces, and/or overall loads experienced by the wing. Any of a variety of other applications could exist, including the non-limiting examples of rotors or other aerodynamic products.

Figure 8:
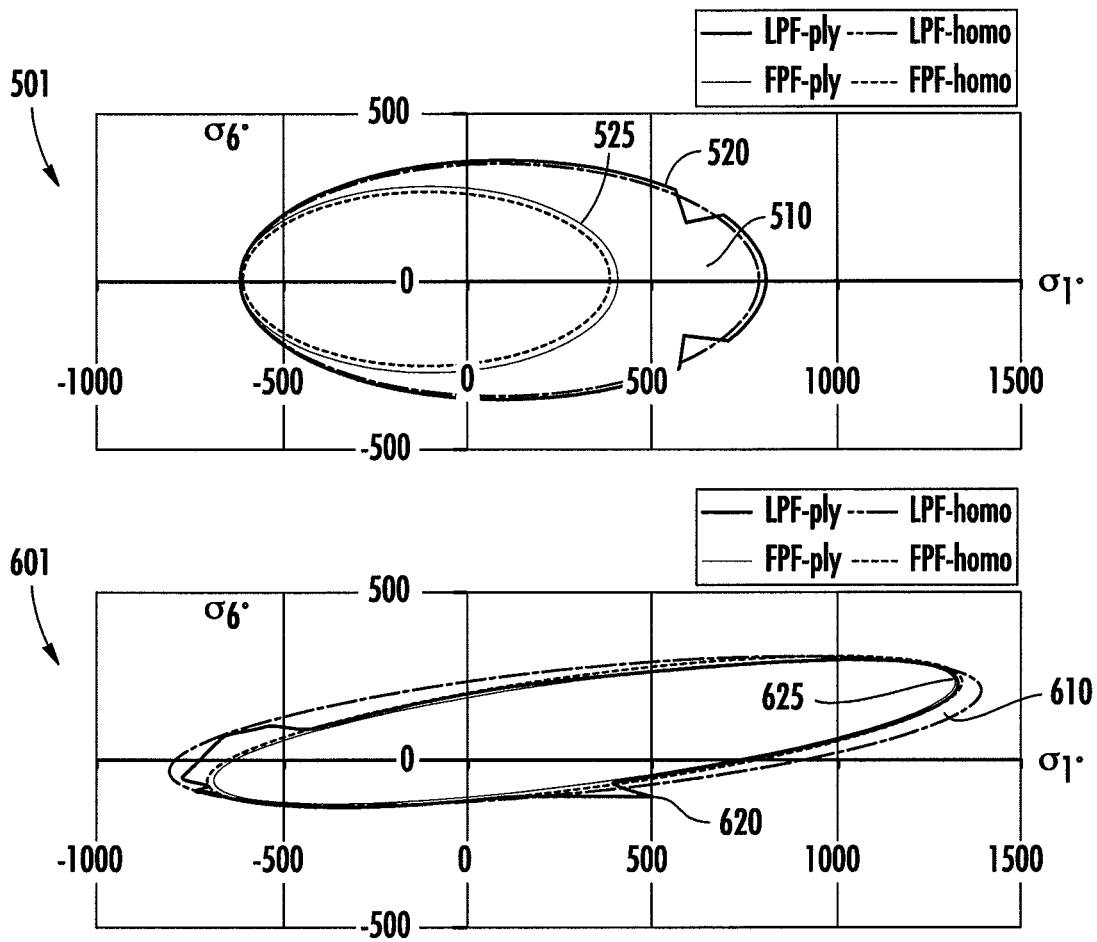
FIG. 8 is a pair of graphs illustrating an exemplary micro-cracking zone in a symmetric laminated structure according to the prior art, together with an exemplary micro-cracking-free zone in the asymmetric, unbalanced laminated structure 10 of FIG. 2 according to various embodiments of the invention.

Turning now to FIG. 8, a pair of complementary graphs illustrates exemplary micro-cracking zones 510, 610, in a conventional composite laminated structure 501 (analogous to structure 1, as previously described herein) and an asymmetric unbalanced laminated structure 601 (analogous to structures 10, 110, as previously described herein). The graphs illustrate respective first ply failure (FPF) zones 525, 625, which, as commonly known and understood in the art, represent the maximum degree of imposed stress at which a first one of the plurality of plies within the laminated structure first experiences a failure event (e.g., rupture, delamination, etc.). The graphs further illustrate respective last ply failure (LPF) zones 520, 620, which, as commonly known and understood in the art, represent the maximum degree of imposed stress at which the last of the plurality of plies within the laminated structure experiences a failure event.

As may be seen from FIG. 8, the plies of conventional structure 501 experience a first ply failure (FPF) 525 under a maximum imposed stress $\sigma_1$ of approximately 400 MPa, while last ply failure (LPF) doesn't generally occur until an imposed stress $\sigma_1$ of approximately 750 MPa is encountered. As such, conventional structures such as 501 (see also 1 of FIG. 1) can encounter an extensive degree of micro-cracking of the matrix for the duration of any force imposition between the first ply failure and the last ply failure. In contrast, as may be seen with reference to laminated structure 601 (analogous to 10 and 110, as previously described), the FPF and LPF occur almost simultaneously, at roughly 1350 MPa. Thus, not only is the structural integrity and strength of laminated structures such as 601 greatly improved, the reduced, and in some cases eliminated differential between the FPF and LPF significantly minimizes micro-cracking. This may also be seen pictorially in FIG. 8 with reference to the difference in relative areas of zone 510 and zone 610, the latter of which essentially eliminates the possibility of prolonged micro-cracking, thereby improving structural strength. While some designers are tolerant of micro-cracking and do not consider it to be a failure of the composite laminate, other designers believe no micro-cracking should be tolerated. With embodiments of the present invention, the FPF and LPF become almost coextensive, thus eliminating micro-cracking and rendering moot the debate over whether micro-cracking is acceptable.

Non-Crimp Fabric

Figure 9:
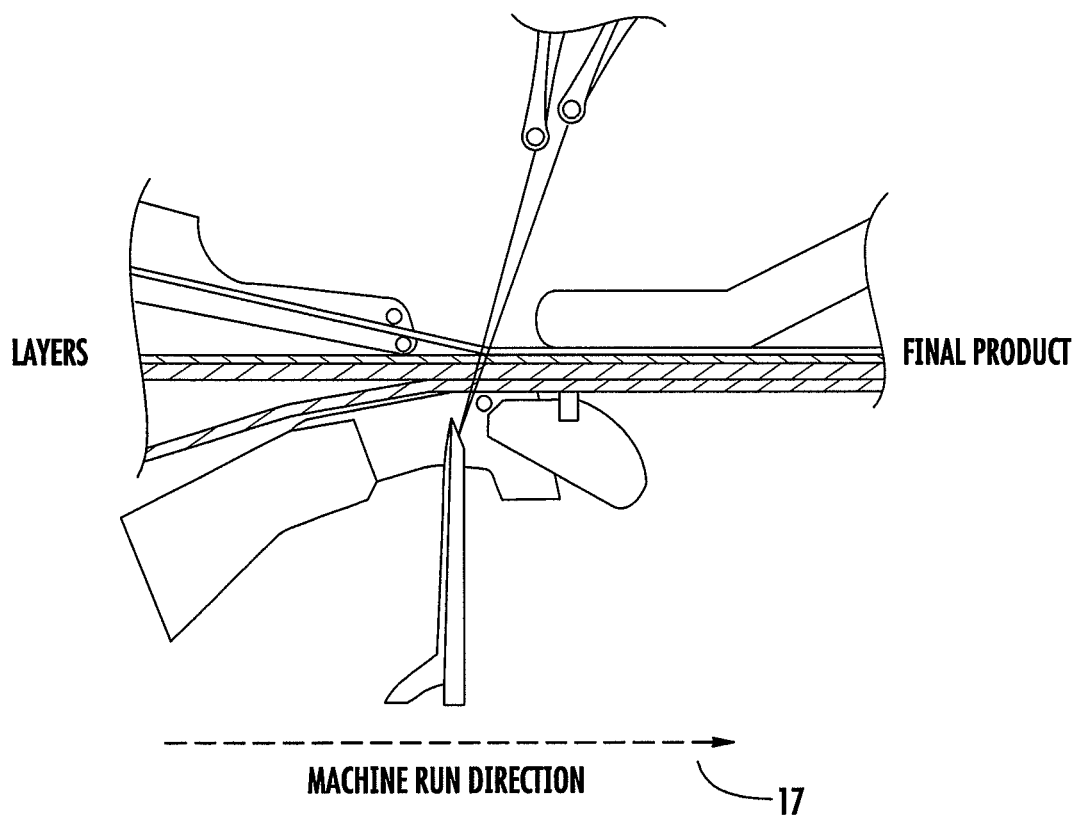
FIG. 9 illustrates a process of stitching a non-crimp fabric layer of the asymmetric sub-laminated structure according to various embodiments.

According to various embodiments, the laminated structure 10 may be constructed primarily from a non-crimp fabric (NCF), which is generally known and understood in the art to provide a feasible balance amongst cost, handling, and performance. NCF is a class of composite materials, which are made with a plurality of layers of unidirectional plies, each differently oriented and substantially joined together by a transverse stitching process, as generally illustrated in at least FIG. 9. The transverse stitching, as generally applied, holds the respective ply layers together, while allowing minimal degrees of freedom between immediately adjacent plies. In particular contrast with other various known and commonly used woven fabrics, the transverse stitching of NCF substantially eliminates the crimp of the carbon fabric (e.g., making it a non-crimped configuration), which reduces mechanical properties and create inefficiencies due to misalignment and the like. Although a transverse stitching process has been described, various alternative processes may be utilized to join the individual plies relative to one another. As non-limiting examples, the plies may be joined to one another via other techniques, such as bonding.

In various embodiments comprising a transverse stitching process, as previously described, a variety of yarn types may be used, depending upon a desired application. In certain embodiments, it may be beneficial to stitch the yarn with the lightest quantity of stitching possible. In those and still other embodiments, the yarn may comprise a 33 dtex PES yarn with an E5 stitching gauge and a chain point of 3.4 millimeters in length. In such embodiments, the stitching area weight is approximately 2.0 g/m². In other embodiments, any of a variety of polyamide or polyimide high temperature-based yarns may be used. In still other embodiments, any of a variety of combinations of stitching gauges, yarn materials, and the like may be used, as may be desirable for a particular application within the scope of the present invention.

In various embodiments of the laminated structure 10 incorporating NCF, the respective layers of unidirectional plies may comprise unidirectional carbon fiber plies and +25° plies. As previously described herein, sub-laminate modules 15 may be formed, with each, in at least such embodiments, comprising a single unidirectional carbon fiber ply and a single +25° ply, thereby facilitating a "one-axis layup" or, alternatively a folded "two-axis layup" for bi-axial normal loading, each eliminating the need for laying off-axis ply layers. Still other embodiments may be alternatively configured with various materials (e.g., fiberglass or an electric conductor such as copper wire) and/or relatively narrow angles or orientation (e.g., as commonly known and understood in the art to be analogous), provided the limitations and parameters as previously described herein remain satisfied. As a non-limiting example, in the context of wind turbine blades, the laminated structure 10 may, instead of carbon fiber plies, incorporate fiberglass plies, as may be desirable for cost or other considerations, as the case may be. In still other embodiments, hybridization may be desirable, leading to a mixture of any of variety of combinations of carbon fiber, fiberglass, and/or periodically spaced electric conductor (e.g., copper wire, as lightning protection), or still other materials as ply layers.

It should be further understood that according to various embodiments the ply layers 12a, 12b of the laminated structure 10 may be formed by further spreading carbon fiber tows, or analogous tows of any desirable material, as is a commonly known and understood practice in the art, at least with respect to balanced and symmetric laminates. At least U.S. Patent Application Pub. No. 2006/0093802 describes various tow spreading practices and is hereby incorporated by reference in its entirety. The spreading of tows this manner enables certain embodiments of the laminated structure 10 to comprise extremely thin ply layers 12a, 12b, each having a thickness of approximately 0.0625 millimeters and a weight of approximately 75 g/m². In these and other embodiments with ply layers of such thicknesses, homogeneity, as previously described herein, may be achieved with a laminated structure 10 having a total thickness of approximately 2.0 millimeters. However, it should be understood that any of a variety of thicknesses for each ply layer, and thus each laminated structure, may be envisioned, provided such is generally less than the at least thinner than conventional unidirectional fiber, having a typical thickness of approximately 0.25 millimeters.

In still further embodiments, the ply layers 12a, 12b of the laminated structure 10, of whatever material formed, may be further variable in thickness, as may be desirable for a particular application. As a non-limiting example, the respective ply layers in certain embodiments may vary anywhere from approximately 0.02 millimeters to 0.08 millimeters, although in other embodiments, ply thickness may vary even up to 0.12 millimeters, as may be desirable for a particular application.

Exemplary Constructions

The laminated structures 10 according to various embodiments, as described herein, may be used in a variety of applications. As non-limiting examples, such may include at least rotary (e.g., wind turbine, helicopter rotor, etc.) blades, aircraft surfaces such as wings and fuselages, and any of a variety of aerospace surfaces. In any of these applications, not only may an asymmetrical and/or unbalanced configuration, as described herein be desirable, but further hybridization of the same may be useful. In other words, although orientations of 10° to approximately 40° (or approximately 15° to 25°, or even any acute angle less than 90°, as the case may be) have been described, certain embodiments may incorporate one or more orientations, depending upon a variety of factors such as the positioning upon a surface.

As a non-limiting example, a wing-like structure may have upper and lower skins with a [0/25°] orientation, with an overlapped region at the leading and/or trailing edges thereof with a [0/±25°/0] orientation (which corresponds, for example, to the sub-laminate module rotation (e.g., flipped or folded) configurations, described previously herein). Such "fish bone" designs, as commonly referred to, may also be considered on stringers in the shape of channels, or sections with combinations of [0/25°] on the webs and fish bone on the caps (or vice-versa), as may be desirable for a particular application. Still further, for cylindrical structures like pipes, vessels, fuselages, various embodiments may comprise a ply orientation of a "±helical angle" configuration, the exact of which angle depends upon the ply material utilized and the various loading conditions as described herein.

Still further, it should be understood that the traditional independent contributions of substructure (e.g., ply layers and/or sub-laminate modules) and skin for respective portions of a stiffened panel (e.g., a wing or blade surface portion) may, according to various embodiments, be completely replaced by a fully coupled anisotropic components (e.g., laminate 10), as described herein. In certain embodiments, the entire laminated structure 10 may be configured such that it is fully coupled and anisotropic, while in other embodiments, the individual components (e.g., ply layers and/or sub-laminate modules 15 (e.g., ply layers and/or sub-laminate modules 15) may each respectively be configured as fully coupled and anisotropic, although the entire stiffened panel formed thereby is not. Various combinations and alternatives may be envisioned, as within the scope of the various embodiments described herein.

Various laminated structure (e.g., ply layers and/or sub-laminate modules) consolidation options exist as well, as are commonly known and understood in the art. Fabrics within the ply layers and/or the sub-laminate modules may be furnished as dry fibers or pre-impregnated with resin (e.g., prepreg). Non-limiting examples of each, as also commonly known and understood in the art, include the non-limiting examples of Resin Transfer Molding, Vacuum Resin Transfer Molding, Heated Vacuum Assist Resin Transfer Molding, out of Autoclave Processes, and Resin Film Infusion.

Further, although various improved tapering procedures have been previously described herein, it should be understood that any of the variety of procedures employed, beyond contributing at least in part to improved time-based efficiencies, further reduce the amount of ply material necessary for the manufacture of various laminated structures having square edges. As a non-limiting example, consider the laminated structure 1 of FIG. 1, which contains a plurality of plies, at least some of which are oriented at +45° or −45°. When applying the conventionally complex tapering procedures, such plies were generally dropped individually, as opposed to the improved sub-laminate module drops described herein. When so dropped, any ply material overhanging the square edge of the taper location would become waste. In accordance with the tapering procedures employed with laminated structures 110, such as that illustrated in FIG. 2, ply drops are not by individual ply layer, but by sub-laminate module. And although such sub-laminate modules according to certain embodiments involve some portion of angled plies (e.g., at 10° to 40°, or alternatively 25°), the modules generally comprise relatively narrow angles, which result in a lesser degree of waste when tapering a laminated structure having square edges, as compared to the degree of conventionally produced waste.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A sub-laminate module for use in forming a composite laminated structure, the sub-laminate module consisting of:
   a primary longitudinal axis corresponding to a primary load-bearing axis of the sub-laminate module;
   a first ply comprising fibers extending in a first orientation;
   a second ply comprising fibers extending in a second orientation, the second orientation being offset relative to the first orientation; and
   an acute angle defined by the relative offset between the first orientation and the second orientation, the acute angle being less than 90° and defining an unbalanced structure of the sub-laminate module,
   wherein:
      the first orientation is aligned with the primary longitudinal axis of the sub-laminate module such that the first ply is aligned with the primary load-bearing axis of the sub-laminate module;

the second orientation is offset relative to the first orientation and the primary longitudinal axis such that the relative offset corresponds to the acute angle and defines the unbalanced structure of the sub-laminate module; and the first ply and the second ply are secured relative to one another via a plurality of transversely oriented stitches, the plurality of transverse stitches being oriented substantially perpendicular relative to the primary longitudinal axis of the sub-laminate module so as to at least in part define a non-crimped configuration.

2. The sub-laminate module of claim 1, wherein the acute angle is less than 45°.

3. The sub-laminate module of claim 1, wherein the acute angle is within a range from about 10° to about 40°.

4. The sub-laminate module of claim 3, wherein the acute angle is within a range of from about 15° to about 30°.

5. The sub-laminate module of claim 4, wherein the acute angle is approximately 25°.

6. The sub-laminate module of claim 1, wherein the fibers of the first and second plies comprise carbon fibers.

7. The sub-laminate module of claim 1, wherein the fibers of the first ply comprise carbon fibers and the fibers of the second ply comprise glass fibers, so as to form a hybrid composition.

8. The sub-laminate module of claim 1, wherein the sub-laminate module is folded in half on itself, relative to an axis extending in the second orientation, such that:

the first ply forms a first and a fourth ply layer; and
the second ply forms a second and a third ply layer,
wherein the fourth ply layer comprises fibers extending in the first orientation and the third ply layer comprises fibers extending in a third orientation, the third orientation being opposite that of the second orientation relative to the primary load-bearing axis of the sub-laminate module.

9. The sub-laminate module of claim 1, wherein at least the first ply has a thickness within a range of from about 0.020 millimeters to about 0.080 millimeters.

10. The sub-laminate module of claim 1, wherein at least the first ply has a thickness of approximately 0.0625 millimeters and a weight of approximately 75 g/m².

11. A sub-laminate module for use in forming a composite laminate, the sub-laminate module consisting of:

a primary longitudinal axis corresponding to a primary load-bearing axis of the sub-laminate module;
a first ply comprising fibers extending in a first orientation, the fibers of the first ply comprising a plurality of spread tows lying adjacent to each other;
a second ply comprising fibers extending in a second orientation, the fibers of the second ply comprising a plurality of spread tows lying adjacent to each other, the second orientation being offset relative to the first orientation; and
an acute angle defined by the relative offset between the first and the second orientations, the acute angle being less than 90° and defining an unbalanced structure of the sub-laminate layer,
wherein:
the first orientation is aligned with the primary longitudinal axis of the sub-laminate module such that the first ply is aligned with the primary load-bearing axis of the sub-laminate module;
the second orientation is offset relative to the first orientation and the primary longitudinal axis such that the relative offset corresponds to the acute angle and defines the unbalanced structure of the sub-laminate module; and
the fibers of the first and the second plies are secured relative to one another via a plurality of stitches.

12. The sub-laminate module of claim 11, wherein the acute angle is within a range of from about 10° to about 40°.

13. The sub-laminate module of claim 12, wherein the acute angle is approximately 25°.

14. The sub-laminate module of claim 11, wherein the fibers of the first and second plies comprise carbon fibers.

15. The sub-laminate module of claim 14, wherein the fibers of the first ply comprise carbon fibers and the fibers of the second ply comprise glass fibers, so as to form a hybrid composition.

16. The sub-laminate module of claim 11, wherein the sub-laminate module is folded in half on itself, relative to an axis extending in the second orientation, such that:

the first ply forms a first and a fourth ply layer, the fourth ply layer comprising a plurality of spread tows lying adjacent to each other; and
the second ply forms a second and a third ply layer, the third ply layer comprising a plurality of spread tows lying adjacent to each other,
wherein the fourth ply layer comprises fibers extending in the first orientation and the third ply layer comprises fibers extending in a third orientation, the third orientation being opposite that of the second orientation relative to the primary load-bearing axis of the sub-laminate module.

17. The sub-laminate module of claim 11, wherein at least the first ply has a thickness of approximately 0.0625 millimeters and a weight of approximately 75 g/m².

18. A composite laminated structure, the composite laminated structure comprising:

a plurality of sub-laminate modules, each module consisting of:
a primary longitudinal axis corresponding to a primary load-bearing axis of the sub-laminate module;
a first ply comprising fibers extending in a first orientation;
a second ply comprising fibers extending in a second orientation, the second orientation being offset relative to the first orientation; and
an acute angle defined by the relative offset between the first orientation and the second orientation, the acute angle being less than 90° and defining an unbalanced structure of the sub-laminate module,
wherein;
the first orientation is aligned with the primary longitudinal axis of the sub-laminate module such that the first ply is aligned with the primary load-bearing axis of the sub-laminate module;
the second orientation is offset relative to the first orientation and the primary longitudinal axis such that the relative offset corresponds to the acute angle and defines the unbalanced structure of the sub-laminate module; and
the first ply and the second ply are secured relative to one another via a plurality of transversely oriented stitches, the plurality of transverse stitches being oriented substantially perpendicular relative to the primary longitudinal axis of the sub-laminate module so as to at least in part define a non-crimped configuration.

19. The composite laminated structure of claim 18, wherein each of the plurality of sub-laminate modules has a thickness within a range of from about 0.040 millimeters to about 0.080 millimeters.

20. The composite laminated structure of claim 18, wherein the structure comprises at least sixteen sub-laminate modules so as to form a homogenous composite material.

21. The composite laminated structure of claim 20, wherein the structure has a thickness of approximately 2.0 millimeters.

22. The composite laminated structure of claim 18, wherein each of the fibers contained within the plurality of sub-laminate modules are oriented in one or the other of only the first orientation or the second orientation.

23. The composite laminated structure of claim 18, wherein:
the acute angle defined within at least a first subset of the plurality of the sub-laminate modules is positively oriented relative to the first orientation; and
the acute angle defined within at least a second subset of the plurality of the sub-laminate modules is negatively oriented relative to the first orientation.

24. The composite laminated structure of claim 23, wherein the first orientation for both the first and the second subsets of the plurality of sub-laminate modules is the same.

25. The composite laminated structure of claim 24, wherein the structure comprises at least eight sub-laminate modules so as to form a homogenous composite material.

26. The composite laminated structure of claim 24, wherein the structure has a thickness of approximately 2.0 millimeters.

27. The composite laminated structure of claim 23, wherein:
the first orientation for the second subset of the plurality of the sub-laminate modules is offset at an angle of approximately 90 degrees relative to the first orientation for the first subset of the plurality of the sub-laminate modules.

28. The composite laminated structure of claim 27, wherein the structure comprises at least eight sub-laminate modules so as to form a homogenous composite material.

29. The composite laminated structure of claim 27, wherein the structure has a thickness of approximately 2.0 millimeters.

30. A composite laminated structure, the composite laminated structure comprising:
a plurality of sub-laminate modules, each module consisting of:
a primary longitudinal axis corresponding to a primary load-bearing axis of the sub-laminate module;
a first ply comprising fibers extending in a first orientation, the fibers of the first ply comprising a plurality of spread tows lying adjacent to each other;
a second ply comprising fibers extending in a second orientation, the fibers of the second ply comprising a plurality of spread tows lying adjacent to each other, the second orientation being offset relative to the first orientation; and
an acute angle defined by the relative offset between the first and the second orientations, the acute angle being less than 90° and defining an unbalanced structure of the sub-laminate layer,
wherein:
the first orientation is aligned with the primary longitudinal axis of the sub-laminate module such that the first ply is aligned with the primary load-bearing axis of the sub-laminate module;
the second orientation is offset relative to the first orientation and the primary longitudinal axis such that the relative offset corresponds to the acute angle and defines the unbalanced structure of the sub-laminate module; and
the fibers of the first and the second plies are secured relative to one another via a plurality of stitches.

31. The composite laminated structure of claim 30, wherein the acute angle is within a range from about 10° to about 40°.

32. The composite laminated structure of claim 30, wherein the acute angle is within a range of from about 15° to about 30°.

33. The composite laminated structure of claim 30, wherein the acute angle is approximately 25°.

34. The composite laminated structure of claim 30, wherein at least the first ply has a thickness of approximately 0.0625 millimeters and a weight of approximately 75 g/m².

35. The composite laminated structure of claim 30, wherein the structure comprises at least sixteen sub-laminate modules.

36. The composite laminated structure of claim 30, wherein the structure has a thickness of approximately 2.0 millimeters.

37. A sub-laminate module for use in forming a composite laminated structure, the sub-laminate module consisting of:
a primary longitudinal axis corresponding to a primary load-bearing axis of the sub-laminate module;
a first ply comprising fibers extending in a first orientation aligned with the primary load-bearing axis of the sub-laminate module;
a second ply comprising fibers extending in a second orientation, the second orientation being offset relative to the first orientation; and
an acute angle defined by the relative offset between the first orientation and the second orientation, the acute angle being less than 30°,
wherein the first ply and the second ply are secured relative to one another via a plurality of transversely oriented stitches, the plurality of transverse stitches being oriented substantially perpendicular relative to the primary longitudinal axis of the sub-laminate module so as to at least in part define a non-crimped configuration.

38. The sub-laminate module of claim 37, wherein the acute angle is approximately 25°.

* * * * *